(12) United States Patent
Takeuchi

(10) Patent No.: US 8,065,919 B2
(45) Date of Patent: Nov. 29, 2011

(54) MEMS DEVICE AND METHOD FOR FABRICATING THE SAME

(75) Inventor: Yusuke Takeuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 9 days.

(21) Appl. No.: 12/621,048

(22) Filed: Nov. 18, 2009

(65) Prior Publication Data

US 2010/0162821 A1 Jul. 1, 2010

(30) Foreign Application Priority Data

Dec. 26, 2008 (JP) ................................. 2008-335032

(51) Int. Cl.
G01L 9/00 (2006.01)
H01L 21/00 (2006.01)

(52) U.S. Cl. ............................... 73/754; 73/756; 438/52

(58) Field of Classification Search .................... None
See application file for complete search history.

(56) References Cited

U.S. PATENT DOCUMENTS

| | | | |
|---|---|---|---|
| 2002/0067663 A1 | 6/2002 | Loeppert et al. | |
| 2003/0016839 A1 | 1/2003 | Loeppert et al. | |
| 2007/0286438 A1 | 12/2007 | Hirade et al. | |
| 2008/0006093 A1 | 1/2008 | Ueya | |
| 2008/0019543 A1 | 1/2008 | Suzuki et al. | |
| 2009/0034760 A1 | 2/2009 | Minamio et al. | |
| 2010/0162821 A1* | 7/2010 | Takeuchi | 73/723 |
| 2010/0197065 A1* | 8/2010 | Zhan et al. | 438/52 |
| 2011/0044480 A1* | 2/2011 | Yamaoka et al. | 381/174 |

FOREIGN PATENT DOCUMENTS

JP 2004-506394 2/2004

OTHER PUBLICATIONS

Loeppert, P. V. et al., "SiSonic™—The First Commercialized MEMS Microphone," Solid-State Sensors, Actuators, and Microsystems Workshop, Jun. 4-8, 2006, pp. 27-30.

* cited by examiner

Primary Examiner — Andre Allen
(74) Attorney, Agent, or Firm — McDermott Will & Emery LLP

(57) ABSTRACT

A MEMS device includes: a substrate having a through hole; a first film provided on a top surface of the substrate with a bottom surface of the first film exposed in the through hole; a second film provided over the first film with an air gap interposed therebetween, and having a hole grouping including holes each in communication with the air gap; and a supporting layer interposed between the first and second films and having the air gap formed therein. Outermost holes of the hole grouping are located at regular intervals along a shape of an opening of the through hole at an upper open end.

11 Claims, 23 Drawing Sheets

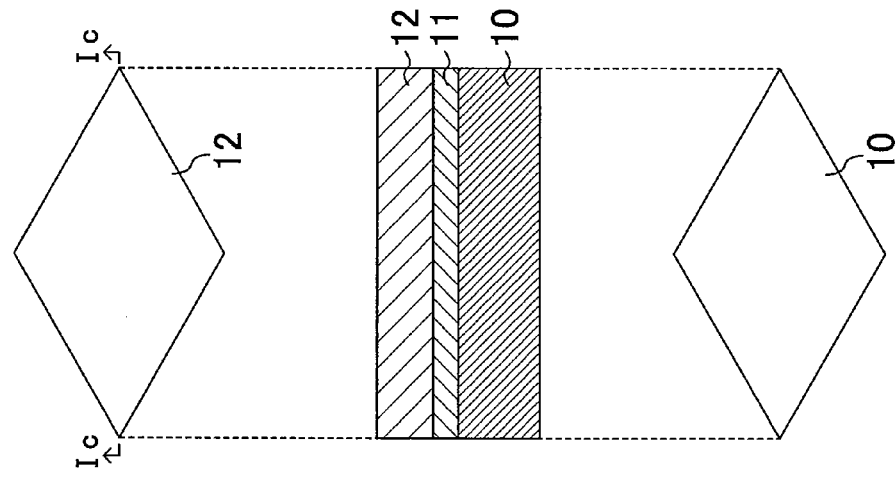
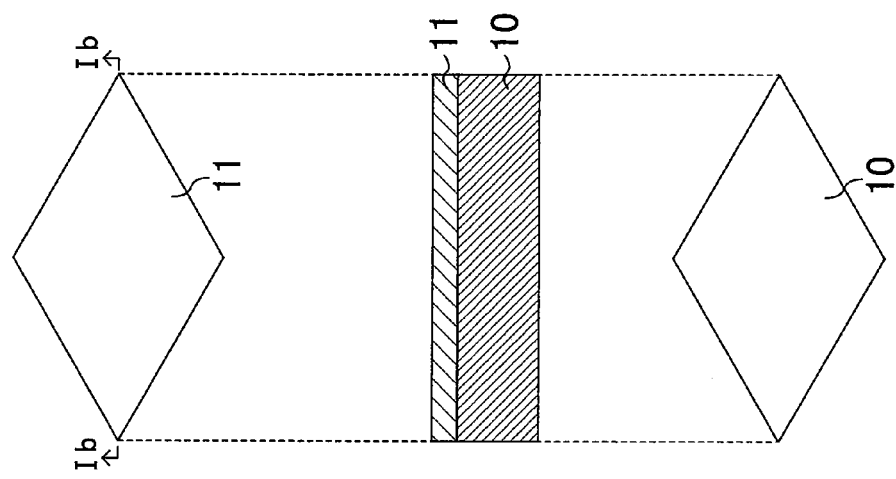
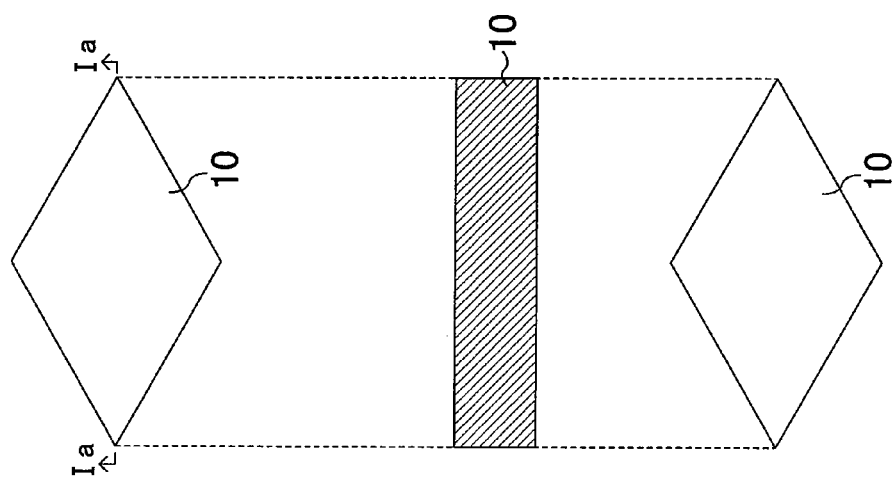

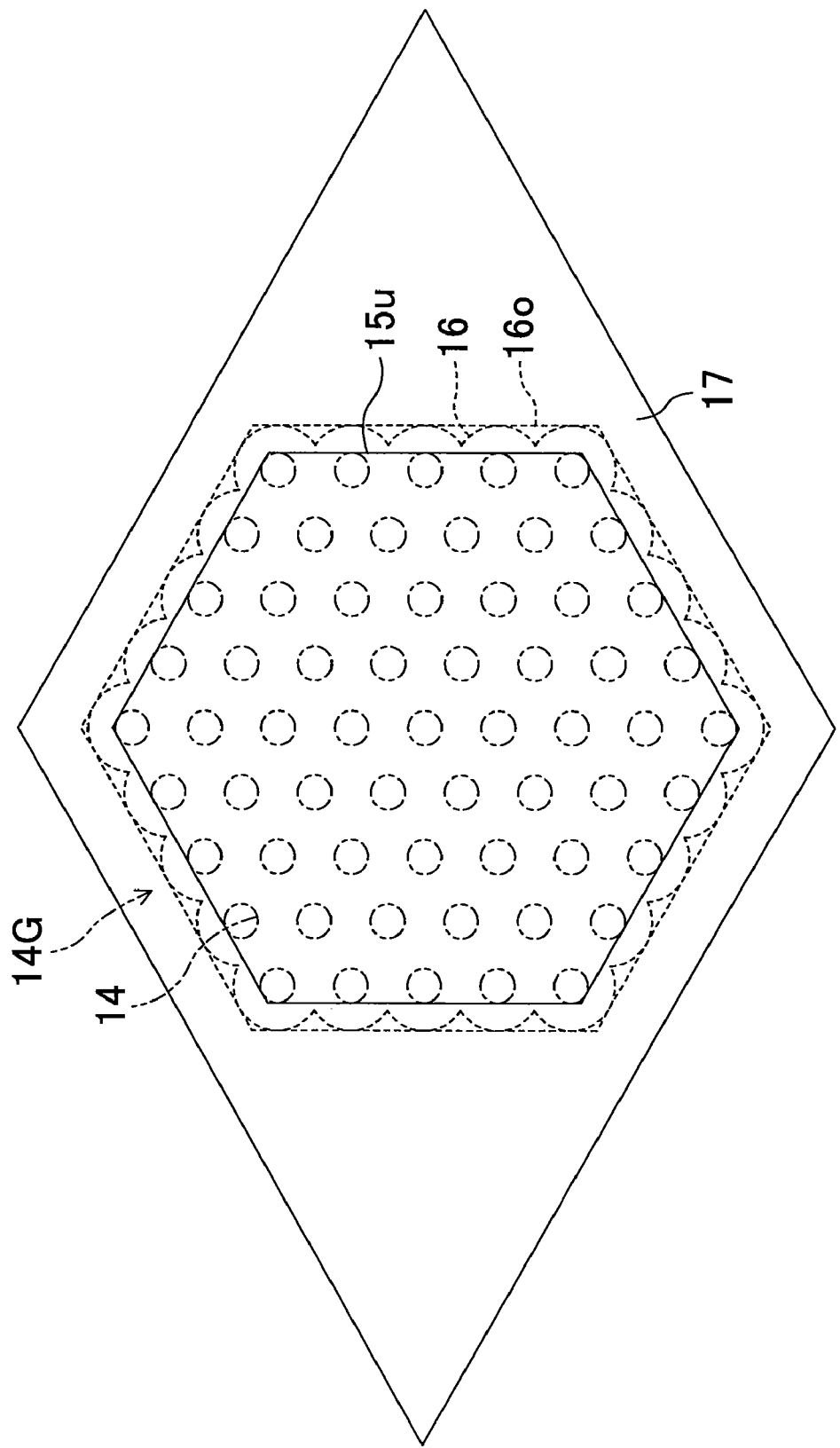

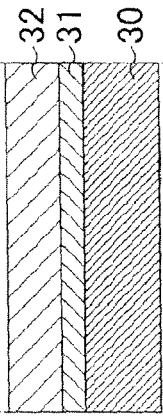

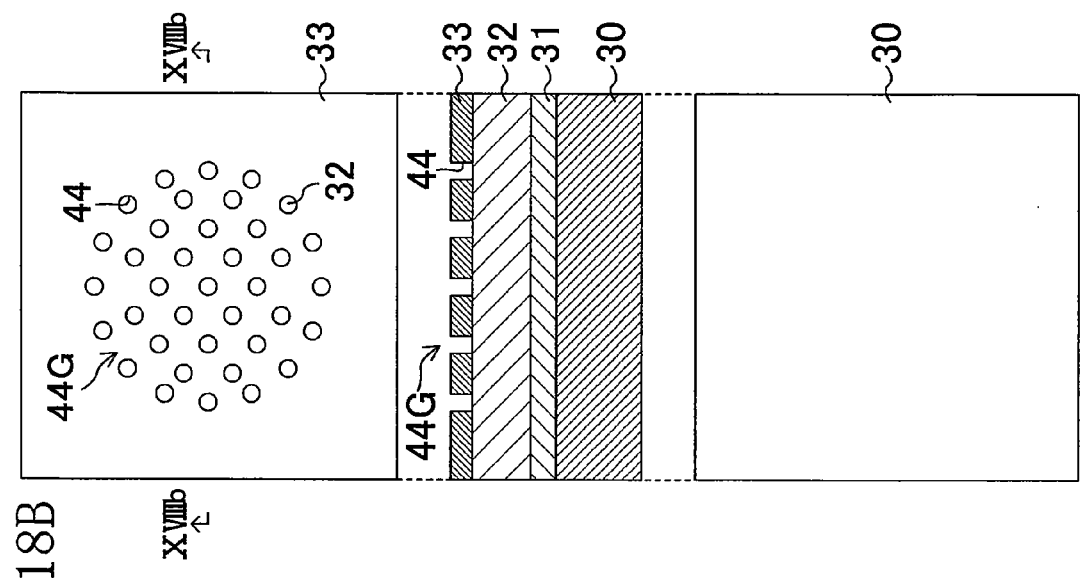
FIG. 18A
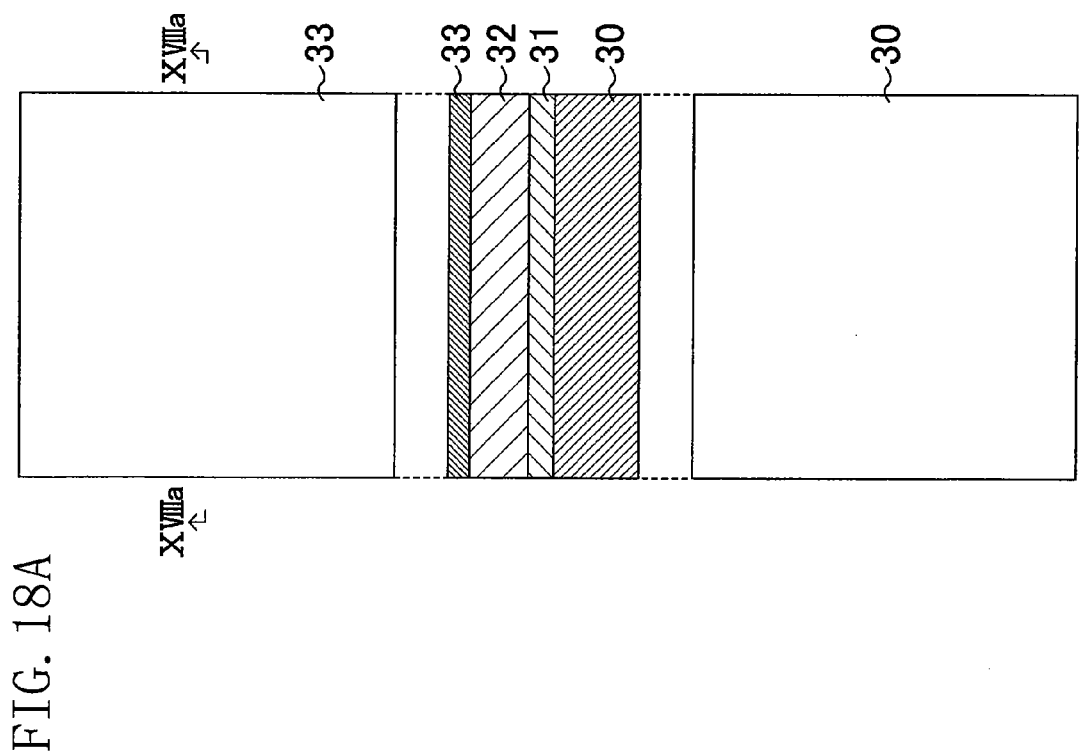
FIG. 18B

MEMS DEVICE AND METHOD FOR FABRICATING THE SAME

CROSS REFERENCE TO RELATED APPLICATION

The disclosure of Japanese Patent Application No. 2008-335032 filed on Dec. 26, 2008 including specification, drawings and claims is incorporated herein by reference in its entirety.

BACKGROUND OF THE INVENTION

The present invention relates to devices, such as sensors, using MEMS (Micro Electro Mechanical Systems) techniques, and methods for fabricating the same.

A technique called MEMS has recently seen progress in the art, which utilizes miniature processing techniques used in the fabrication of semiconductor LSI (Large Scale Integration) circuits. Using MEMS techniques, various miniature components, such as acceleration sensors, pressure sensors, and sonic sensors, have been proposed, and commercialization thereof has started.

Devices using MEMS techniques (hereinafter referred to as "MEMS devices") include, as their major components, a substrate having a through hole, a diaphragm provided on the top surface of the substrate, a fixed film provided over the diaphragm with an air gap interposed therebetween and having a hole grouping composed of holes, and a supporting layer interposed between the diaphragm and the fixed film.

The configuration of a fixed film having a hole grouping composed of holes will be described below with reference to FIG. 23 (see, for example, Patent Document 1: Japanese Unexamined Patent Application Publication No. 2004-506394). FIG. 23 is a plan view illustrating the configuration of a fixed film in a conventional MEMS device.

As shown in FIG. 23, a hole grouping 201G, in which all holes 201 are arranged in a lattice pattern, is formed in a fixed film 200. When the center points of four adjacent holes 201 in the hole grouping 201G are connected, a square shape is formed in the lattice (see the dotted lines shown in FIG. 23).

SUMMARY OF THE INVENTION

In MEMS device fabrication methods, one known technique for forming an air gap and a supporting layer is to form these elements by using a hole grouping. Specifically, there is a known technique in the art in which, for example, an etchant is supplied through the holes of a hole grouping to permeate part of a sacrificial layer interposed between a diaphragm and a fixed film, and the part of the sacrificial layer having the permeating etchant therein is removed, thereby forming an air gap in the sacrificial layer, and forming a supporting layer out of the remaining part of the sacrificial layer.

In this technique, the air gap is formed so that its shape in plan view is defined along the outermost holes of the hole grouping. In other words, the supporting layer is formed so that the inner side surfaces thereof form a shape along the outermost holes of the hole grouping.

More specifically, for example, in the MEMS device including the fixed film shown in FIG. 23, the air gap is formed so that its shape in plan view is defined along the outermost holes 201 of the hole grouping 201G as set forth above. Therefore, as shown in FIG. 24, the air gap 300 is formed so as to have nonuniform corner portions C300 in its shape in plan view. In other words, the supporting layer is formed so that the inner side surfaces thereof form a shape having nonuniform corner portions.

Thus, in the part of the fixed film that is in contact with the supporting layer, those parts being in contact with the nonuniform corner portions are subjected to higher stress than the part being in contact with the other part of the supporting layer. Consequently, stress is concentrated in the parts of the fixed film being in contact with the corner portions, and cracks occur in those parts of the fixed film where stress is concentrated.

In this way, the present inventor, who focused on the supporting layer formation method, found that the supporting layer is formed using the hole grouping, and thus is formed so that the inner side surfaces thereof have a shape defined along the outermost holes of the hole grouping. The present inventor also found that when the inner side surfaces of the supporting layer have a nonuniform shape, stress is concentrated, and thus cracks occur in the part of the fixed film that is in contact with the supporting layer.

In view of the above, it is an object of the present invention to prevent cracks in fixed films in MEMS devices.

In order to achieve the object, a MEMS device according to a first aspect of the present invention includes: a substrate having a through hole; a first film provided on a top surface of the substrate with a bottom surface of the first film exposed in the through hole; a second film provided over the first film with an air gap interposed therebetween, and having a hole grouping including holes each in communication with the air gap; and a supporting layer interposed between the first and second films and having the air gap formed therein. Outermost holes of the hole grouping are located at regular intervals along a shape of an opening of the through hole at an upper open end.

In the MEMS device according to the first aspect of the present invention, the outermost holes of the hole grouping are located at regular intervals along the shape of the opening of the through hole at the upper open end. Thus, the supporting layer is formed so that the inner side surfaces thereof form a shape having uniform corresponding portions (in other words, the supporting layer is formed so that the inner side surfaces thereof have a uniform shape). This prevents concentration of stress (specifically, e.g., tensile stress or the like applied to the second film) and resulting cracks in the part of the second film that is in contact with the supporting layer. Here, when the openings of the holes have, e.g., a quadrilateral shape, the term "corresponding portions" means corner portions along the quadrilateral shapes, and when the openings of the holes have, e.g., a circular shape, curved portions along the circular shapes.

At the same time, it is also possible to prevent concentration of stress and resulting cracks in the inner side surfaces of the supporting layer, because the supporting layer is formed so that the inner side surfaces thereof form a shape having uniform corresponding portions.

In addition, the prevention of cracks in the second film allows the second film to be formed with higher tensile stress being applied thereto, thereby preventing the second film from sticking to the first film.

In the MEMS device according to the first aspect of the present invention, inner side surfaces of the supporting layer preferably form a shape having uniform corresponding portions, which are uniformly located corresponding to the respective outermost holes of the hole grouping.

In the MEMS device according to the first aspect of the present invention, the holes of the hole grouping are preferably arranged in a lattice pattern.

Then, the holes of the hole grouping are uniformly arranged in the second film.

In the MEMS device according to the first aspect of the present invention, holes of the hole grouping other than the outermost holes are preferably arranged in a lattice pattern.

Then, the holes of the hole grouping other than the outermost holes are uniformly arranged in the second film.

In the MEMS device according to the first aspect of the present invention, the shape of the opening of the through hole at the upper open end is preferably quadrilateral, hexagonal, octagonal, circular, or elliptical.

In order to achieve the above-described object, a method for fabricating a MEMS device according to a second aspect of the present invention includes the steps of: (a) forming a first film on a top surface of a substrate; (b) forming a second film over the first film with a sacrificial layer interposed therebetween; (c) forming, in the second film, a hole grouping including holes each passing through the second film; (d) forming, in the substrate, a through hole exposing a bottom surface of the first film, after the step (c) is performed; and (e) removing, using the hole grouping, parts of the sacrificial layer corresponding to the respective holes of the hole grouping, thereby forming an air gap in the sacrificial layer and forming a supporting layer out of a remaining part of the sacrificial layer, after the step (d) is performed. In the step (c), the hole grouping is formed so that outermost holes thereof are located at regular intervals along a shape of an opening of the through hole at an upper open end; and in the step (e), the supporting layer is formed so that inner side surfaces thereof form a shape along the outermost holes of the hole grouping.

In the method for fabricating a MEMS device according to the second aspect of the present invention, the outermost holes of the hole grouping are located at regular intervals along the shape of the opening of the through hole at the upper open end. Consequently, the supporting layer is formed so that the inner side surfaces thereof form a shape having uniform corresponding portions. This prevents concentration of stress (specifically, e.g., tensile stress or the like applied to the second film) and resulting cracks in the part of the second film that is in contact with the supporting layer.

At the same time, it is also possible to prevent concentration of stress and resulting cracks in the inner side surfaces of the supporting layer, because the supporting layer is formed so that the inner side surfaces thereof form a shape having uniform corresponding portions.

In addition, the prevention of cracks in the second film allows the second film to be formed with higher tensile stress being applied thereto, thus preventing the second film from sticking to the first film in the process step of forming the air gap and the supporting layer.

In the method for fabricating a MEMS device according to the second aspect of the present invention, in the step (e), an etchant or an etching gas is preferably supplied to the parts of the sacrificial layer through the holes of the hole grouping, thereby removing those parts.

In the method for fabricating a MEMS device according to the second aspect of the present invention, in the step (c), the hole grouping is preferably formed so that the holes thereof are arranged in a lattice pattern.

Then, the holes of the hole grouping are uniformly arranged in the second film, thus enabling an etchant or etching gas to uniformly permeate the parts of the sacrificial layer in the process step of forming the air gap and the supporting layer.

In the method for fabricating a MEMS device according to the second aspect of the present invention, in the step (c), the hole grouping is preferably formed so that holes thereof other than the outermost holes are arranged in a lattice pattern.

Then, the holes of the hole grouping other than the outermost holes are uniformly arranged in the second film, thus enabling an etchant or etching gas to uniformly permeate the parts of the sacrificial layer in the process step of forming the air gap and the supporting layer.

In the method for fabricating a MEMS device according to the second aspect of the present invention, in the step (d), the through hole is preferably formed so that the shape of the opening at the upper open end is quadrilateral, hexagonal, octagonal, circular, or elliptical.

It will be appreciated that the characteristics described above may be combined in any noncontradictory manner as appropriate. Also, even when multiple effects are expected in each characteristic, all of those effects need not necessarily be produced.

As set forth above, in the MEMS device and fabrication method therefor according to the first and second aspects of the present invention, the outermost holes of the hole grouping are located at regular intervals along the shape of the opening of the through hole at the upper open end. Thus, the supporting layer is formed so that the inner side surfaces thereof form a shape having uniform corresponding portions. This prevents concentration of stress (specifically, e.g., tensile stress or the like applied to the second film) and resulting cracks in the part of the second film that is in contact with the supporting layer.

At the same time, it is also possible to prevent concentration of stress and resulting cracks in the inner side surfaces of the supporting layer, because the supporting layer is formed so that the inner side surfaces thereof form a shape having uniform corresponding portions.

In addition, the prevention of cracks in the second film allows the second film to be formed with higher tensile stress being applied thereto, thus preventing the second film from sticking to the first film in the process step of forming the air gap and the supporting layer.

BRIEF DESCRIPTION OF THE DRAWINGS

FIGS. 1A-1C sequentially show process steps of a method for fabricating a MEMS device according to a first embodiment of the present invention, illustrating how major components thereof are formed.

FIG. 4 is a plan view illustrating the configuration of a hole grouping, the upper open end of a through hole, an air gap, and a supporting layer in the MEMS device according to the first embodiment of the present invention.

FIGS. 13A-13C sequentially show process steps of a method for fabricating a MEMS device according to a second modified example of the first embodiment of the present invention, illustrating how major components thereof are formed.

FIGS. 18A and 18B sequentially show process steps of the method for fabricating the MEMS device according to the second embodiment of the present invention, illustrating how the major components thereof are formed.

DETAILED DESCRIPTION OF THE INVENTION

Figure 2A:
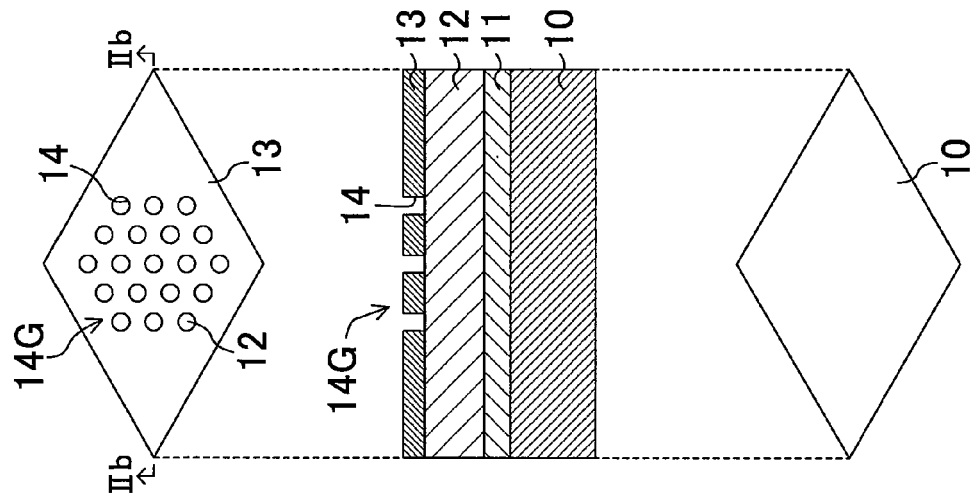
FIGS. 2A and 2B sequentially show process steps of the method for fabricating the MEMS device according to the first embodiment of the present invention, illustrating how the major components thereof are formed.

The embodiments of the present invention will be described hereinafter with reference to the accompanying drawings.

First Embodiment

The following describes a MEMS device according to a first embodiment of the present invention with reference to FIGS. 1A to 1C, 2A and 2B, 3A and 3B, 4, 5, 6A and 6B, and 7.

A method for fabricating the MEMS device according to the first embodiment of the present invention will be described below with reference to FIGS. 1A to 3B. FIGS. 1A to 3B sequentially show process steps of the method for fabricating the MEMS device according to the first embodiment of the present invention, illustrating how the major components thereof are formed. To be specific, in FIGS. 1A to 3B, the plan views shown in the upper sections are as seen from above the top surface of a substrate, the cross-sectional views shown the middle sections are taken along the lines Ia-Ia to IIIb-IIIb respectively, and the plan views shown in the lower sections are as seen from the bottom surface of the substrate. Herein, "the top surface of the substrate" means the side of the substrate where a diaphragm is formed, and "the bottom surface of the substrate" means the side facing the side where the diaphragm is formed.

First, as shown in FIG. 1A, there is provided a substrate 10 having a (110) crystal face, and having a rhombic shape in plan view. The substrate 10 may be made of silicon, for example.

Next, as shown in FIG. 1B, a diaphragm 11, having a rhombic shape in plan view, is formed on the top surface of the substrate 10. The diaphragm 11 needs to function as a vibrating electrode. Thus, it is preferable to use, as the diaphragm 11, a single-layer film of a conductive film or a multilayer film composed of a conductive film and an insulating film. Examples of the conductive film include a polysilicon film and a metal film, such as an aluminum film. Examples of the insulating film include a silicon oxide film and a silicon nitride film.

Subsequently, as shown in FIG. 1C, a sacrificial layer 12, having a rhombic shape in plan view, is formed on the diaphragm 11. The sacrificial layer 12 is partially removed in a later process step to form an air gap (see the reference numeral 16 in FIG. 3B). The remaining part of the sacrificial layer 12 that has not been removed serves as a supporting layer (see the reference numeral 17 in FIG. 3B) for supporting a fixed film (see the reference numeral 13 in FIG. 3B). In this embodiment, the thickness of the sacrificial layer 12 is set to a desired air gap height (in other words, a desired supporting layer height), e.g., 4 μm. As the sacrificial layer 12, an insulating film is preferably used. The insulating film may be a silicon oxide film, for example.

Then, as shown in FIG. 2A, the fixed film 13, having a rhombic shape in plan view, is formed on the sacrificial layer 12. The fixed film 13, which needs to function as a fixed electrode, is formed with tensile stress applied thereto. As the fixed film 13, a single-layer film of a conductive film or a multilayer film composed of a conductive film and an insulating film is preferably used. Examples of the conductive film include a polysilicon film and a metal film, such as an aluminum film. Examples of the insulating film include a silicon oxide film and a silicon nitride film. In this way, the fixed film 13 is formed over the diaphragm 11 with the sacrificial layer 12 interposed therebetween.

Figure 2B:
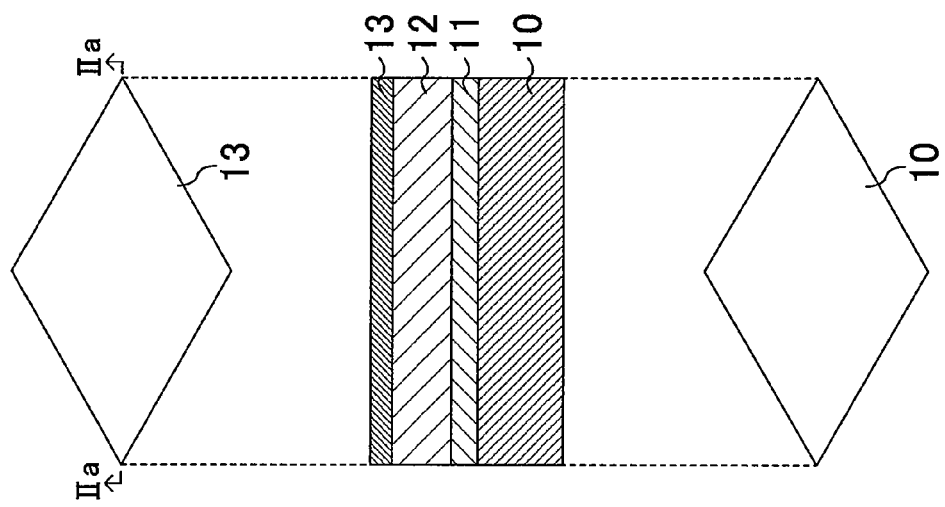

Next, as shown in FIG. 2B, holes 14 are formed through the fixed film 13, each exposing the top surface of the sacrificial layer 12, thereby forming a hole grouping 14G, composed of the holes 14, in the fixed film 13. In this process step, the hole grouping 14G is formed in such a manner that the outermost holes 14 thereof are located at regular intervals along the shape of the opening of a through hole (which is to be formed in a subsequent process step) at the open end that is located at the same level as the substrate top surface (hereinafter referred to as the "upper open end"; see the reference numeral 15u in FIG. 3A). The hole grouping 14G is also formed so that the holes 14 thereof are arranged in a lattice pattern. Here, "the hole grouping" means the set of all holes formed in the fixed film.

Figures 3A, 3B:
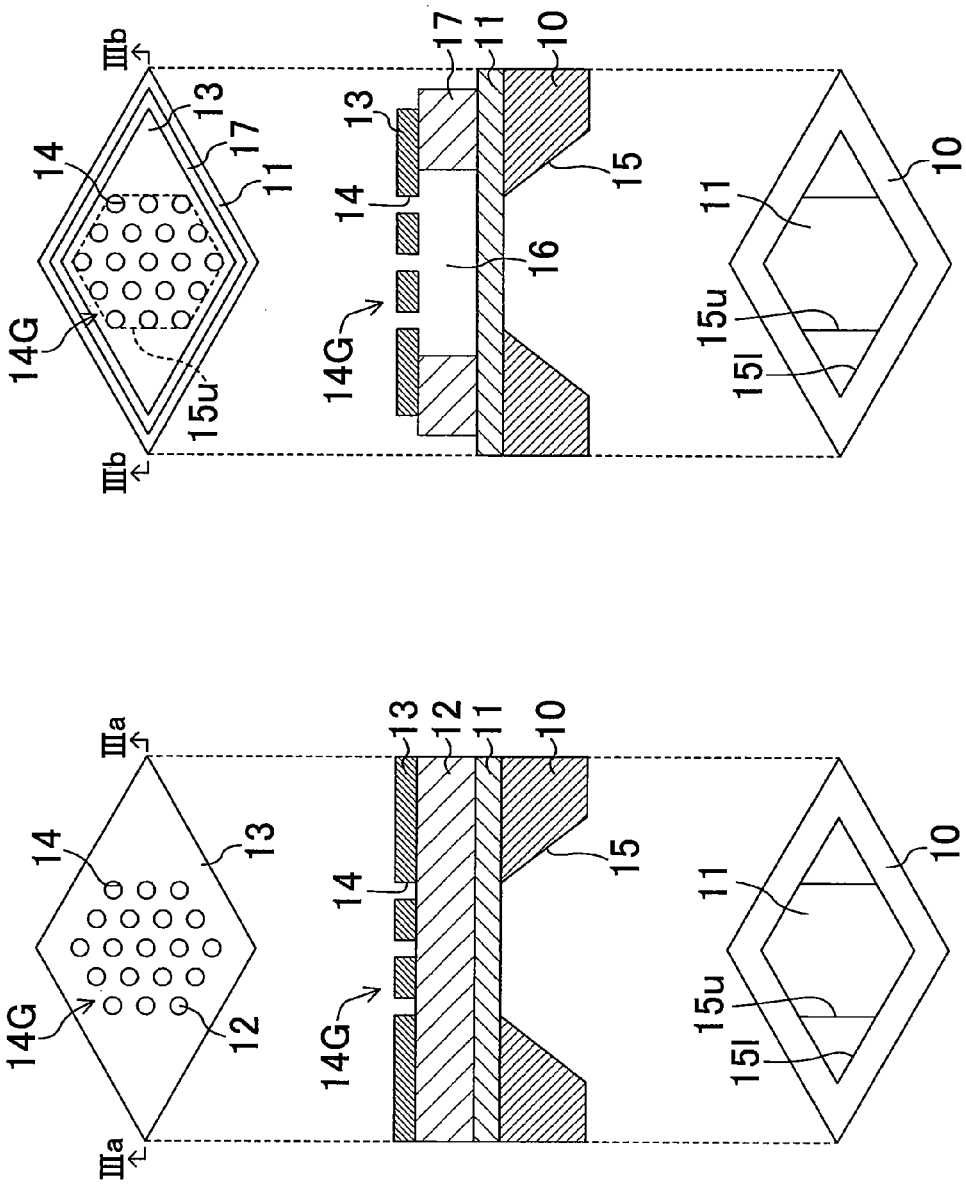
FIGS. 3A and 3B sequentially show process steps of the method for fabricating the MEMS device according to the first embodiment of the present invention, illustrating how the major components thereof are formed.

Next, as shown in FIG. 3A, a thin film (not shown) having an opening pattern is formed on the bottom surface of the substrate 10. Then, with the thin film used as a mask, the substrate 10 is wet etched using an etchant, which is an alkaline chemical solution, such as, KOH (potassium hydroxide) or TMAH (tetramethyl ammonium hydroxide, $(CH_3)_4NOH$), for example. As a result, a through hole 15, in which the bottom surface of the diaphragm 11 is exposed, is formed through the substrate 10. In this process step, as can be seen from the plan view shown in the lower section of FIG. 3A, the through hole 15 is formed so that its opening has a rhombic shape at the open end 15l located at the same level as the substrate bottom surface (hereinafter referred to as the "lower open end"), and has a hexagonal shape at the upper open end 15u. Then, the thin film is removed.

Subsequently, as shown in FIG. 3B, an etchant, for example, an acid chemical solution, such as HF (hydrofluoric acid), is supplied through the holes 14 of the hole grouping 14G so as to permeate parts of the sacrificial layer 12. The etchant spreads outwardly from each hole 14 of the hole grouping 14G to permeate parts of the sacrificial layer 12. Consequently, the parts of the sacrificial layer 12 in which the etchant has permeated are removed, thereby forming the air gap 16 in the sacrificial layer 12, and forming the supporting layer 17 out of the remaining part of the sacrificial layer 12. In this way, the parts of the sacrificial layer 12 corresponding to the respective holes 14 of the hole grouping 14G are removed using the hole grouping 14G, thereby forming the air gap 16 and the supporting layer 17. In this process step, the air gap 16 is formed so that its shape in plan view is defined along the outermost holes 14 of the hole grouping 14G, and the supporting layer 17 is formed so that its inner side surfaces form a shape along the outermost holes 14 of the hole grouping 14G. Here, "the parts of the sacrificial layer corresponding to the respective holes of the hole grouping" include (1) parts of the sacrificial layer located directly under the respective holes of the hole grouping, and (2) parts of the sacrificial layer located under the outer edges of the respective holes.

In this manner, the MEMS device according to this embodiment is fabricated.

The configuration of the MEMS device according to the first embodiment of the present invention will be described below with reference to FIG. 3B.

As shown in FIG. 3B, the MEMS device according to this embodiment includes: the substrate 10 having the through hole 15; the diaphragm (first film) 11 provided on the top surface of the substrate 10 with the bottom surface of the diaphragm 11 partially exposed in the through hole 15; the fixed film (second film) 13 provided over the diaphragm 11 with the air gap 16 interposed therebetween and having the hole grouping 14G composed of the holes 14 each in communication with the air gap 16; and the supporting layer 17 interposed between the diaphragm 11 and the fixed film 13 and having the air gap 16 formed therein.

Now, the configuration of the hole grouping 14G, the upper open end 15u of the through hole 15, the air gap 16, and the supporting layer 17 will be discussed with reference to FIG. 4. FIG. 4 is a plan view illustrating the configuration of the hole grouping, the upper open end of the through hole, the air gap, and the supporting layer in the MEMS device according to the first embodiment of the present invention. Although the number of holes 14 of the hole grouping 14G shown in FIG. 4 differs from that in FIG. 3B, the number of holes 14 in each figure is provided only as an optimum number for simplicity of illustration, and differs from the actual number.

As shown in FIG. 4, the through hole with the opening having a hexagonal shape at the upper open end 15u, the supporting layer 17 with the air gap 16 formed therein, and the hole grouping 14G are located in that order in the direction from the bottom surface to the top surface of the substrate.

In this embodiment, the air gap 16 is formed using the hole grouping 14G, specifically, by removing the parts of the sacrificial layer 12 corresponding to the respective holes 14 of the hole grouping 14G. Consequently, as shown in FIG. 4, the detailed shape of the air gap 16 in plan view is defined along the outermost holes 14 of the hole grouping 14G, and has uniform curved portions corresponding to the respective outermost holes 14. On the other hand, the general shape of the air gap 16 in plan view is hexagonal as shown in FIG. 4 (see the reference numeral 16o).

In other words, the shape formed by the inner side surfaces of the supporting layer 17 is defined along the outermost holes 14 of the hole grouping 14G, and has uniform curved portions (corresponding portions) corresponding to the respective outermost holes 14, because the supporting layer 17 is formed of the remaining part of the sacrificial layer 12 that has not been removed.

Furthermore, since the air gap 16 is formed using the hole grouping 14G, the general shape of the air gap 16 in plan view is similar to, but larger than, the shape of the opening of the through hole at the upper open end 15u as shown in FIG. 4.

The outermost holes 14 of the hole grouping 14G are located at regular intervals along the shape of the opening of the through hole at the upper open end 15u (in other words, along the general shape of the air gap 16 in plan view) as shown in FIG. 4. Also, as shown in FIG. 4, the holes 14 of the hole grouping 14G are arranged in a lattice pattern.

As shown in FIG. 3B, the through hole 15 is formed so as to correspond to the air gap 16 with the diaphragm 11 interposed therebetween. The area of the opening of the through hole at the upper open end 15u is smaller than that of the opening of the air gap 16 as shown in FIG. 4. Thus, the top surface of the part of the diaphragm 11 exposed in the through hole 15 is entirely exposed in the air gap 16.

Figure 5:
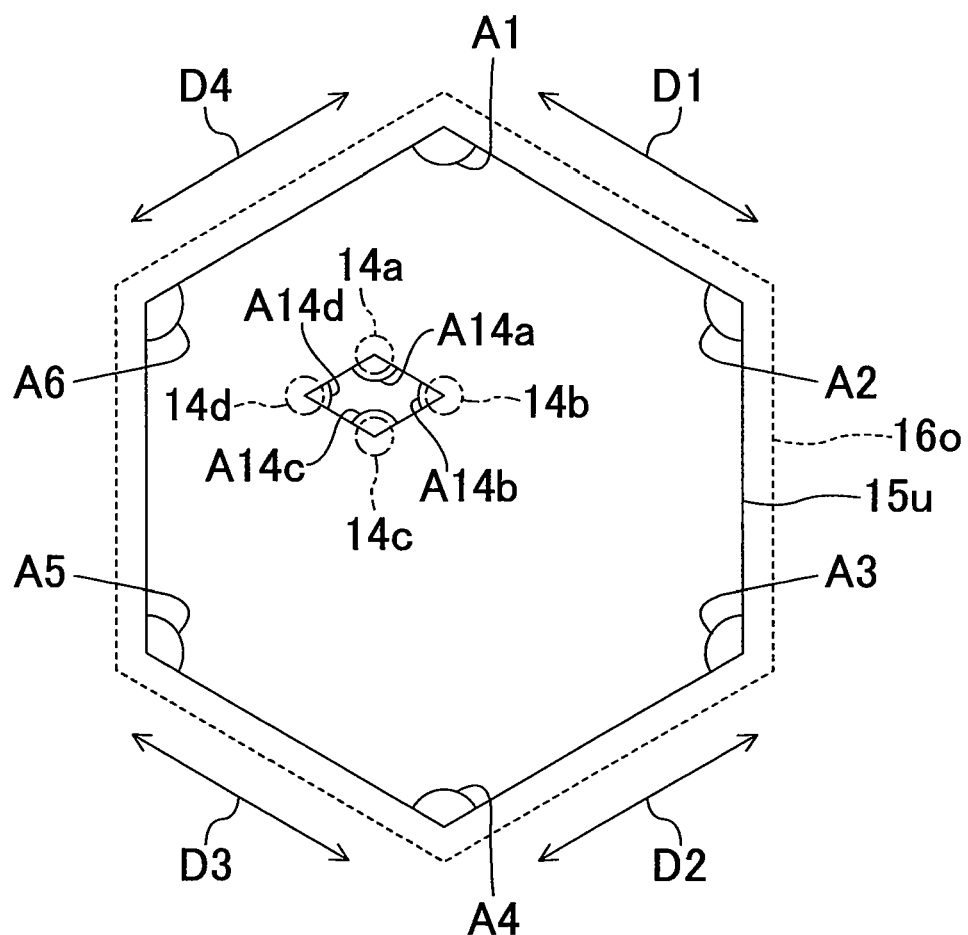
FIG. 5 is a plan view illustrating the configuration of the hole grouping, the upper open end of the through hole, and the air gap in the MEMS device according to the first embodiment of the present invention.

Now, the configuration of the hole grouping 14G will be discussed with reference to FIG. 5. FIG. 5 is a plan view illustrating the configuration of the hole grouping, the upper open end of the through hole, and the air gap in the MEMS device according to the first embodiment of the present invention. FIG. 5 shows the same configuration as FIG. 4. However, in FIG. 5, the illustration of the holes of the hole grouping other than the four adjacent holes, the detailed illustration of the air gap, and the illustration of the supporting layer are omitted for simplicity of illustration.

As shown in FIG. 5, when the center points of the four adjacent holes 14a to 14d in the hole grouping 14G are connected, a rhombic shape is formed in the lattice.

When the opening of the through hole at the upper open end 15u has a hexagonal shape satisfying:

the interior angle A1, A4=x°, and the interior angle A2, A3, A5, A6=180°−0.5x°, then the shape formed in the lattice by connecting the center points of the four adjacent holes 14a to 14d in the hole grouping 14G is a rhombic shape satisfying:

the interior angle A14a, A14c=x°, and the interior angle A14b, A14d=180°−x°.

As shown in FIG. 5, it is assumed that the first, second, third, and fourth sides of the shape of the opening of the through hole at the upper open end 15u extend in the first-, second-, third-, and fourth-side directions D1, D2, D3, and D4, respectively. In this case, of the four adjacent holes 14a to 14d, the holes 14a and 14b are located adjacent to each other in the first-side direction D1, the holes 14b and 14c are located adjacent to each other in the second-side direction D2, the holes 14c and 14d are located adjacent to each other in the third-side direction D3, and the holes 14d and 14a are located adjacent to each other in the fourth-side direction D4.

The following describes functions of the MEMS device of this embodiment.

In the MEMS device of this embodiment, when sound pressure, air pressure, or the like, for example, travels to the diaphragm 11 through the holes 14 of the hole grouping 14G, the part of the diaphragm 11 exposed in the through hole 15 vibrates. This vibration causes the distance between the diaphragm 11 and the fixed film 13 (the height of the air gap 16) to vary slightly, so that the capacity of the capacitor composed of the diaphragm 11 and the fixed film 13 changes. By reading this capacity change, the MEMS device of this embodiment functions as various kinds of sensors. When reading capacity change due to sound pressure, the MEMS device functions as a sonic sensor. When reading capacity change due to air pressure, the MEMS device functions as a pressure sensor. When reading capacity change resulting from change in acceleration, the MEMS device functions as an acceleration sensor (in this case, the holes 14 function as holes through which air passes).

Figure 6A:
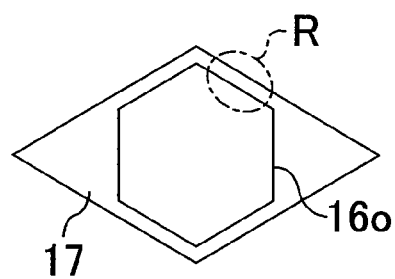
FIG. 6A is a plan view illustrating the configuration of the air gap and the supporting layer in the MEMS device of the first embodiment of the present invention.
Figure 6B:
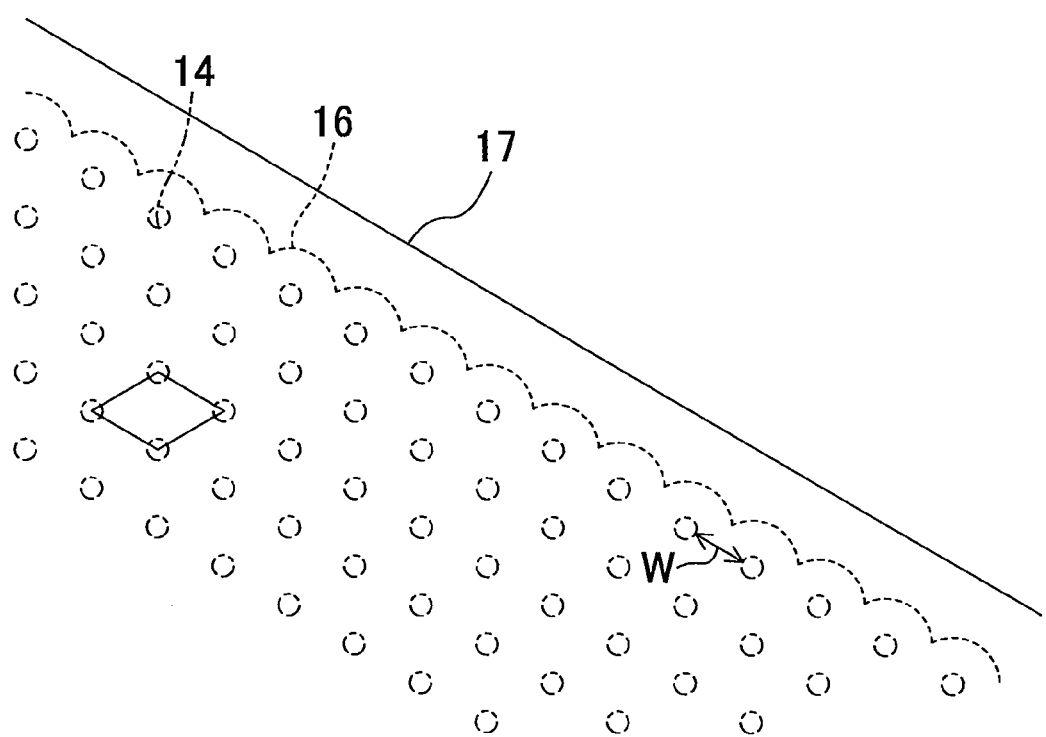
FIG. 6B is a plan view illustrating the configuration of the holes, the air gap, and the supporting layer in the MEMS device of the first embodiment of the present invention.
Figure 7:
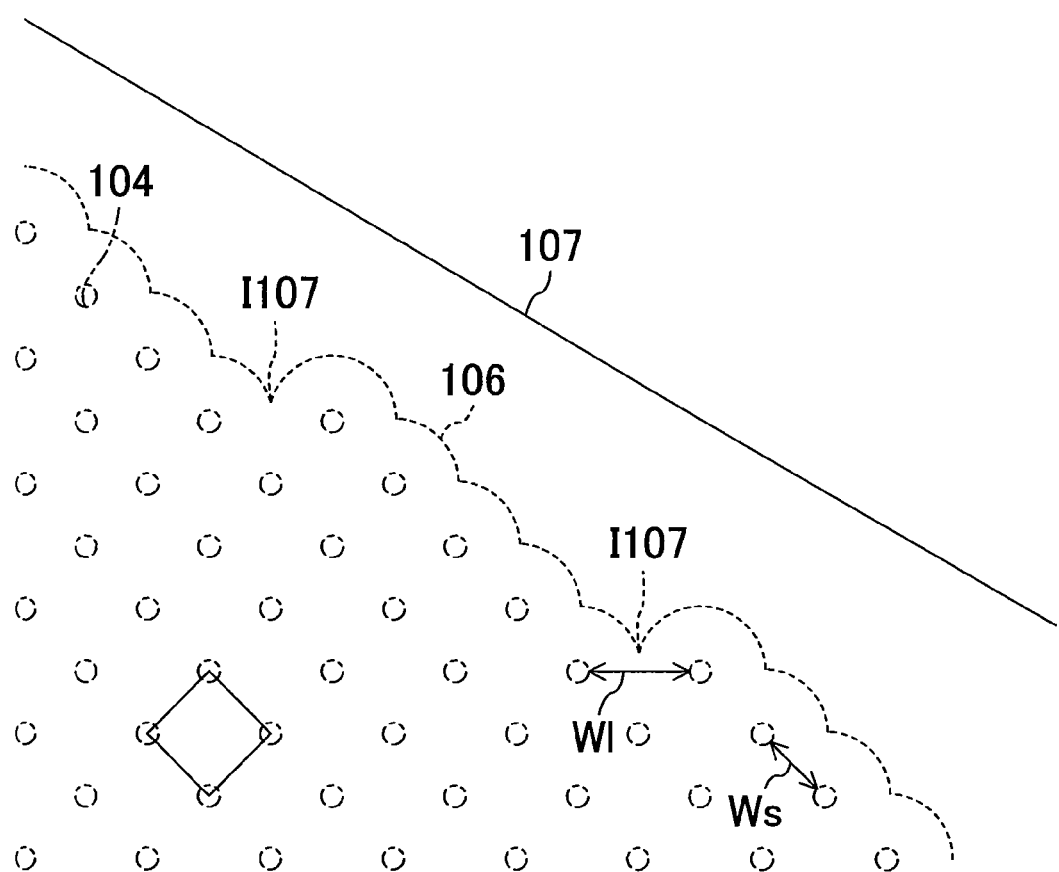
FIG. 7 is a plan view illustrating the configuration of holes, an air gap, and a supporting layer in a MEMS device according to a comparative example.
Figure 8A:
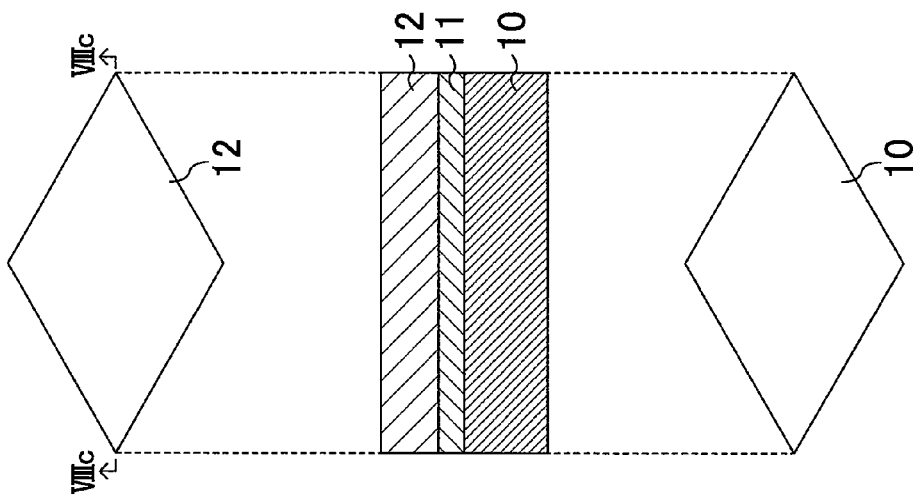
FIGS. 8A-8C sequentially show process steps of a method for fabricating a MEMS device according to a first modified example of the first embodiment of the present invention, illustrating how major components thereof are formed.
Figure 8B:
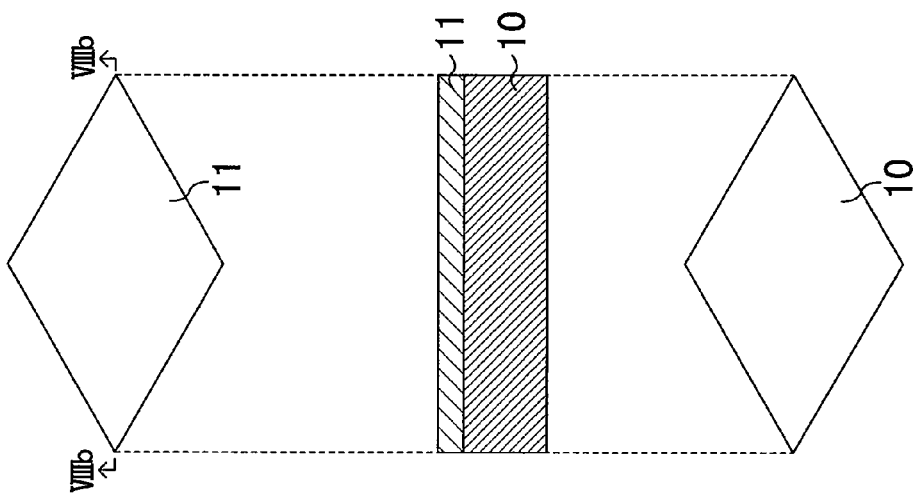
Figure 8C:
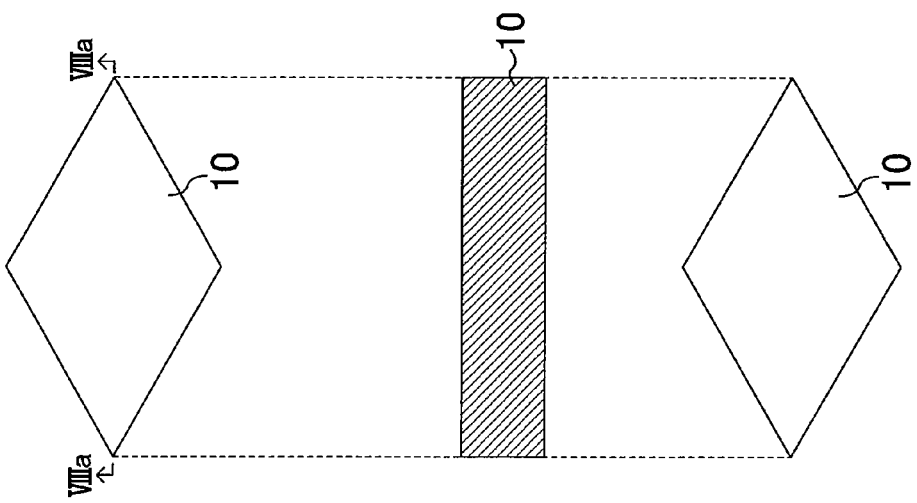

Now, in order to effectively describe effects of this embodiment, a description will be made by referring to this embodiment and a comparative example. FIG. 6A is a plan view illustrating the configuration of the air gap and the supporting layer in the MEMS device of the first embodiment of the present invention. However, in FIG. 6A, only a schematic diagram of the air gap is shown, and a detailed illustration thereof is omitted. FIG. 6B is a plan view illustrating the configuration of the holes, the air gap, and the supporting layer in the MEMS device of the first embodiment of the present invention. Specifically, FIG. 6B is a magnified plan view of an area R shown in FIG. 6A. FIG. 7 is a plan view illustrating the configuration of holes, an air gap, and a supporting layer in a MEMS device according to the comparative example. Although the number of holes 14 shown in FIG. 6B differs from that in FIG. 4, the number of holes 14 in each figure is provided only as an optimum number for simplicity of illustration, and differs from the actual number.

This embodiment and the comparative example differ in their configuration in the following respects.

In this embodiment, as shown in FIG. 6B, when the center points of four adjacent holes 14 in the hole grouping are connected, a rhombic shape is formed in the lattice. The outermost holes 14 of the hole grouping are located at regular intervals as shown in FIG. 6B (see the interval W) along the shape of the opening of the through hole at the upper open end 15u as shown in FIG. 4.

On the other hand, in the comparative example, as shown in FIG. 7, when the center points of four adjacent holes 104 in the hole grouping are connected, a square shape is formed in the lattice. The outermost holes 104 of the hole grouping are not located at regular intervals (see the intervals Wl and Ws), and, although not shown, those outermost holes 104 are not located along the shape of the opening of a through hole at the upper open end. As can be seen from FIGS. 6B and 7, "the outermost holes of the hole grouping" means those holes that contribute to the determination of the shape formed by the inner side surfaces of the supporting layer (in other words, the shape of the air gap in plan view).

In this way, this embodiment and the comparative example differ in the arrangement of the holes 14, 104 of the hole grouping.

In this embodiment, the outermost holes 14 of the hole grouping are located at regular intervals along the shape of the opening of the through hole at the upper open end. Hence, as shown in FIG. 6B, the detailed shape of the air gap 16 in plan view has uniform curved portions corresponding to the respective outermost holes 14 of the hole grouping. On the other hand, in the comparative example, as shown in FIG. 7, the detailed shape of the air gap 106 in plan view has nonuniform curved portions corresponding to the respective outermost holes 104 of the hole grouping. In other words, in this embodiment, the shape formed by the inner side surfaces of the supporting layer 17 has uniform curved portions, while in the comparative example, the shape formed by the inner side surfaces of the supporting layer 107 has nonuniform curved portions.

Therefore, in this embodiment, in which the shape formed by the inner side surfaces of the supporting layer 17 has the uniform curved portions, stress (specifically, e.g., tensile stress or the like applied to the fixed film) is not concentrated in the part of the fixed film that is in contact with the supporting layer 17. In contrast, in the comparative example, in which the shape formed by the inner side surfaces of the supporting layer 107 has the nonuniform curved portions, stress is concentrated in the part of the fixed film that is in contact with the supporting layer 107. To be specific, for example, in the part of the fixed film that is in contact with the supporting layer 107, those parts being in contact with intersection points I107 (see FIG. 7) are subjected to higher stress than the part being in contact with the other part of the supporting layer 107. This causes concentration of stress in the parts of the fixed film that are in contact with the intersection points I107.

In this embodiment, the outermost holes 14 of the hole grouping 14G are located at regular intervals along the shape of the opening of the through hole 15 at the upper open end 15u. Consequently, the supporting layer 17 is formed so that its inner side surfaces form a shape having uniform curved portions (in other words, the supporting layer 17 is formed so that its inner side surfaces form a shape having uniformly spaced intersection points (the term "intersection points" as used herein means points at which curved portions meet)). This prevents concentration of stress (specifically, e.g., tensile stress or the like applied to the fixed film 13) and resulting cracks in specific locations (specifically, e.g., at specific intersection points or the like) in the part of the fixed film 13 that is in contact with the supporting layer 17.

At the same time, it is also possible to prevent concentration of stress and resulting cracks in specific locations (specifically, e.g., at specific intersection points or the like) in the inner side surfaces of the supporting layer 17, because the supporting layer 17 is formed so that the inner side surfaces thereof form a shape having the uniform curved portions.

In addition, as set forth above, since cracks are prevented in the fixed film 13, the fixed film 13 can be formed with higher tensile stress being applied thereto. This prevents the fixed film 13 from sticking to the diaphragm 11 in the process step of forming the air gap and the supporting layer.

Furthermore, the holes 14 of the hole grouping 14G, which are arranged in a lattice pattern, are uniformly arranged in the fixed film 13, allowing an etchant to uniformly permeate parts of the sacrificial layer 12 in the process step of forming the air gap and the supporting layer.

Moreover, since the area of the opening of the through hole 15 at the upper open end 15u is formed smaller than that of the opening of the air gap 16, the top surface of the part of the diaphragm 11 exposed in the through hole 15 is entirely exposed in the air gap 16, thereby allowing the entire part of the diaphragm 11 exposed in the through hole 15 to vibrate.

In the specific example described in this embodiment, an etchant is supplied to parts of the sacrificial layer 12 through the holes 14 of the hole grouping 14G to remove those parts (specifically, the parts of the sacrificial layer 12 corresponding to the respective holes 14 of the hole grouping 14G are removed by a wet-etching process). However, the present invention is not limited to this.

One example of an alternative approach may be to use an etching gas, which is a mixture of a gas containing anhydrous hydrofluoric acid and a gas containing methyl alcohol, or which is a gas containing xenon difluoride, and supply the etching gas to parts of the sacrificial layer through the holes of the hole grouping to remove those parts (specifically, the parts of the sacrificial layer corresponding to the respective holes of the hole grouping may be removed by a dry-etching process). Another example of an alternative approach may be a combined use of dry etching and wet etching for removal of the parts of the sacrificial layer corresponding to the respective holes of the hole grouping.

Furthermore, in the specific example described in this embodiment, as shown in FIG. 4, the outermost holes 14 of the hole grouping 14G are located at regular intervals along the shape of the opening of the through hole at the upper open end 15u, and the holes 14 of the hole grouping 14G are arranged in a lattice pattern. However, the present invention is not limited to this specific example.

One example of an alternative approach may be as follows: the holes of the hole grouping other than the outermost holes (hereinafter referred to as "inner holes of the hole grouping") may be arranged in a lattice pattern, while the outermost holes are located at regular intervals along the shape of the opening of the through hole at the upper open end.

Another example of an alternative approach may be as follows: the inner holes of the hole grouping may be arranged randomly, while the outermost holes are located at regular intervals along the shape of the opening of the through hole at the upper open end. In this case, however, the inner holes are arranged so as to not to create a situation where the parts of the sacrificial layer that should be removed remain to cause a failure of proper formation of the air gap.

Furthermore, in the specific example described in this embodiment, in order to achieve the object of the present invention effectively, the outermost holes 14 of the hole grouping 14G are located at the same regular intervals along all six sides of the shape (i.e., the hexagonal shape) of the opening of the through hole at the upper open end 15u as shown in FIG. 4. However, the present invention is not limited to this. For example, in the hole grouping, the outermost holes along each side of the hexagonal shape may be located at regular intervals specifically determined for that side.

First Modified Example of the First Embodiment

The following describes a MEMS device according to a first modified example of the first embodiment of the present invention with reference to FIGS. 8A to 8C, 9A and 9B, 10A and 10B, 11, and 12.

A method for fabricating the MEMS device according to the first modified example of the first embodiment of the present invention will be described below with reference to FIGS. 8A to 10B. FIGS. 8A to 10B sequentially show process steps of the method for fabricating the MEMS device according to the first modified example of the first embodiment of the present invention, illustrating how the major components thereof are formed. To be specific, in FIGS. 8A to 10B, the plan views shown in the upper sections are as seen from above the top surface of a substrate, the cross-sectional views shown in the middle sections are taken along the lines VIIIa-VIIIa to Xb-Xb, respectively, and the plan views shown in the lower sections are as seen from the bottom surface of the substrate. In FIGS. 8A to 10B, the same components as those of the first embodiment shown in FIGS. 1A to 3B are identified by the same reference numerals. Thus, in this modified example, the description already provided in the first embodiment will not be repeated as appropriate in order to avoid duplication.

Figure 9A:
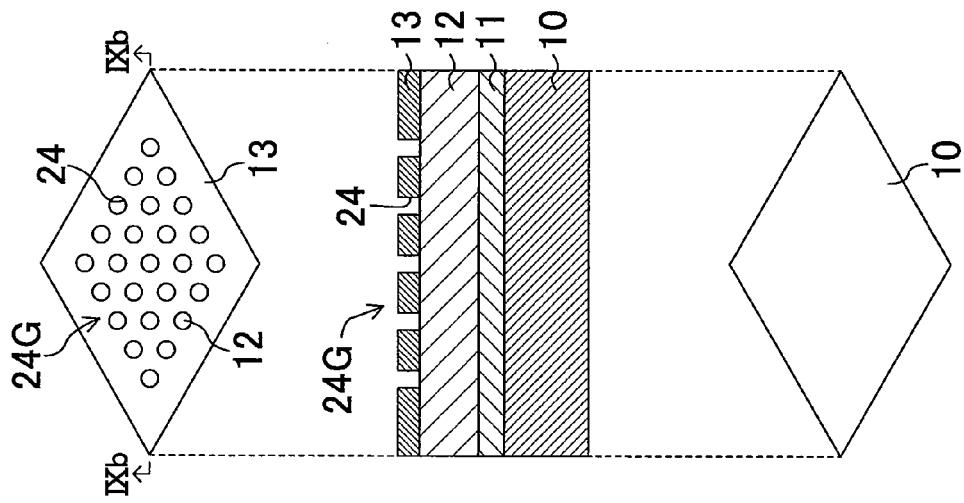
FIGS. 9A and 9B sequentially show process steps of the method for fabricating the MEMS device according to the first modified example of the first embodiment of the present invention, illustrating how the major components thereof are formed.

First, process steps shown in FIGS. 8A to 9A are sequentially performed in the same manner as the process steps shown in FIGS. 1A to 2A in the first embodiment, thereby obtaining the configuration shown in FIG. 9A (i.e., obtaining a configuration similar to that shown in FIG. 2A in the first embodiment).

Figure 9B:
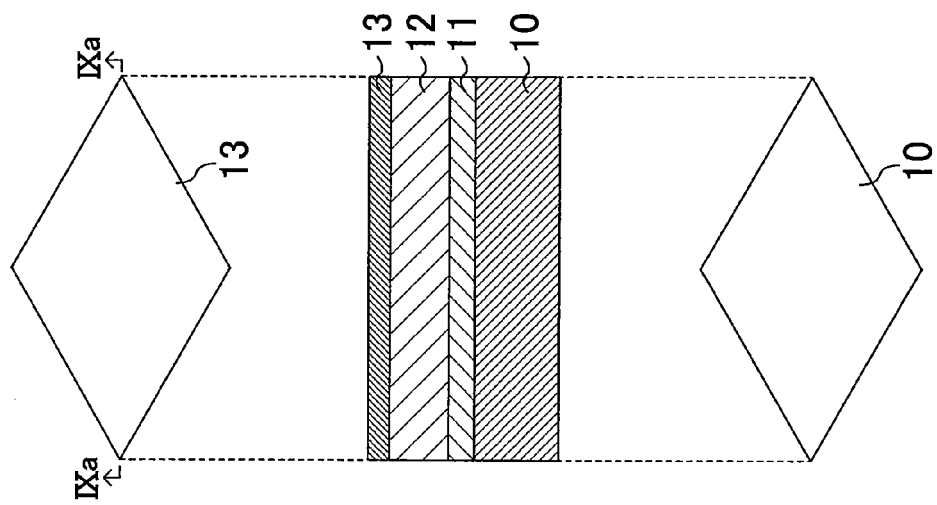

Next, as shown in FIG. 9B, holes 24 are formed through the fixed film 13, each exposing the top surface of the sacrificial layer 12, thereby forming a hole grouping 24G, composed of the holes 24, in the fixed film 13. In this process step, the hole grouping 24G is formed in such a manner that the outermost holes 24 thereof are located at regular intervals along the shape of the opening of a through hole (which is to be formed in a subsequent process step) at the upper open end. The hole grouping 24G is also formed so that the holes 24 thereof are arranged in a lattice pattern.

Figure 10A:
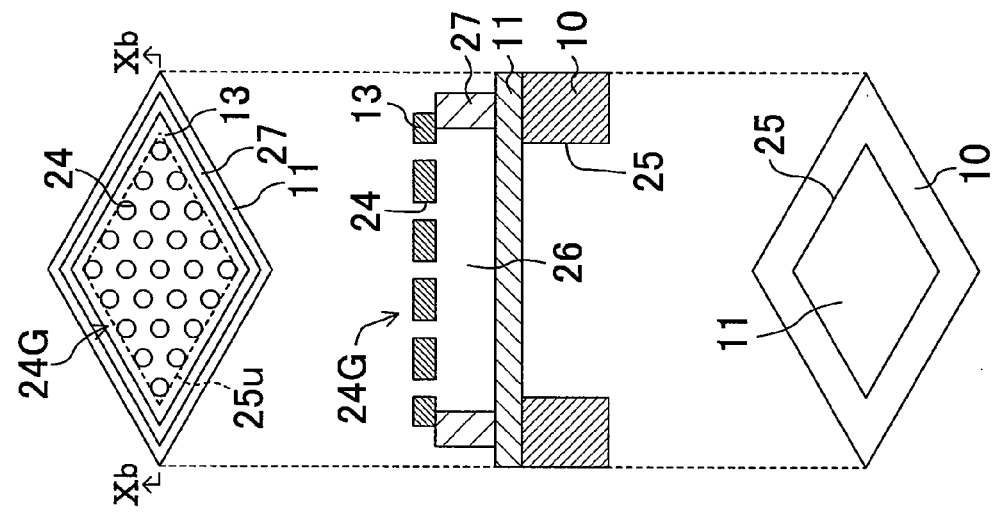
FIGS. 10A and 10B sequentially show process steps of the method for fabricating the MEMS device according to the first modified example of the first embodiment of the present invention, illustrating how the major components thereof are formed.

Then, as shown in FIG. 10A, in a manner similar to that shown in FIG. 3A in the first embodiment, a through hole 25 is formed through the substrate 10 to expose the bottom surface of the diaphragm 11. In this process step, as can be seen from the plan view shown in the lower section of FIG. 10A, the through hole 25 is formed so that its opening has a rhombic shape at the upper and lower open ends.

Figure 10B:
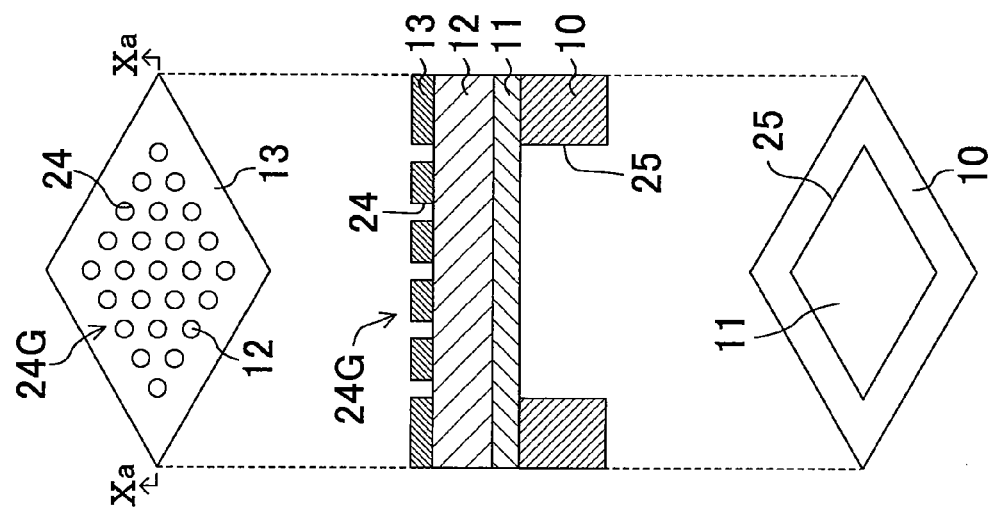

Subsequently, as shown in FIG. 10B, in a manner similar to that shown in FIG. 3B in the first embodiment, parts of the sacrificial layer 12 corresponding to the respective holes 24 of the hole grouping 24G are removed using the hole grouping 24G, thereby forming an air gap 26 in the sacrificial layer 12, and forming a supporting layer 27 out of the remaining part of the sacrificial layer 12.

In this way, the MEMS device according to this modified example is fabricated.

The configuration of the MEMS device according to the first modified example of the first embodiment of the present invention will be described below with reference to FIG. 10B.

As shown in FIG. 10B, the MEMS device according to this modified example includes: the substrate 10 having the through hole 25; the diaphragm 11 provided on the top surface of the substrate 10 with the bottom surface of the diaphragm 11 partially exposed in the through hole 25; the fixed film 13 provided over the diaphragm 11 with the air gap 26 interposed therebetween and having the hole grouping 24G composed of the holes 24 each in communication with the air gap 26; and the supporting layer 27 interposed between the diaphragm 11 and the fixed film 13 and having the air gap 26 formed therein.

Figure 11:
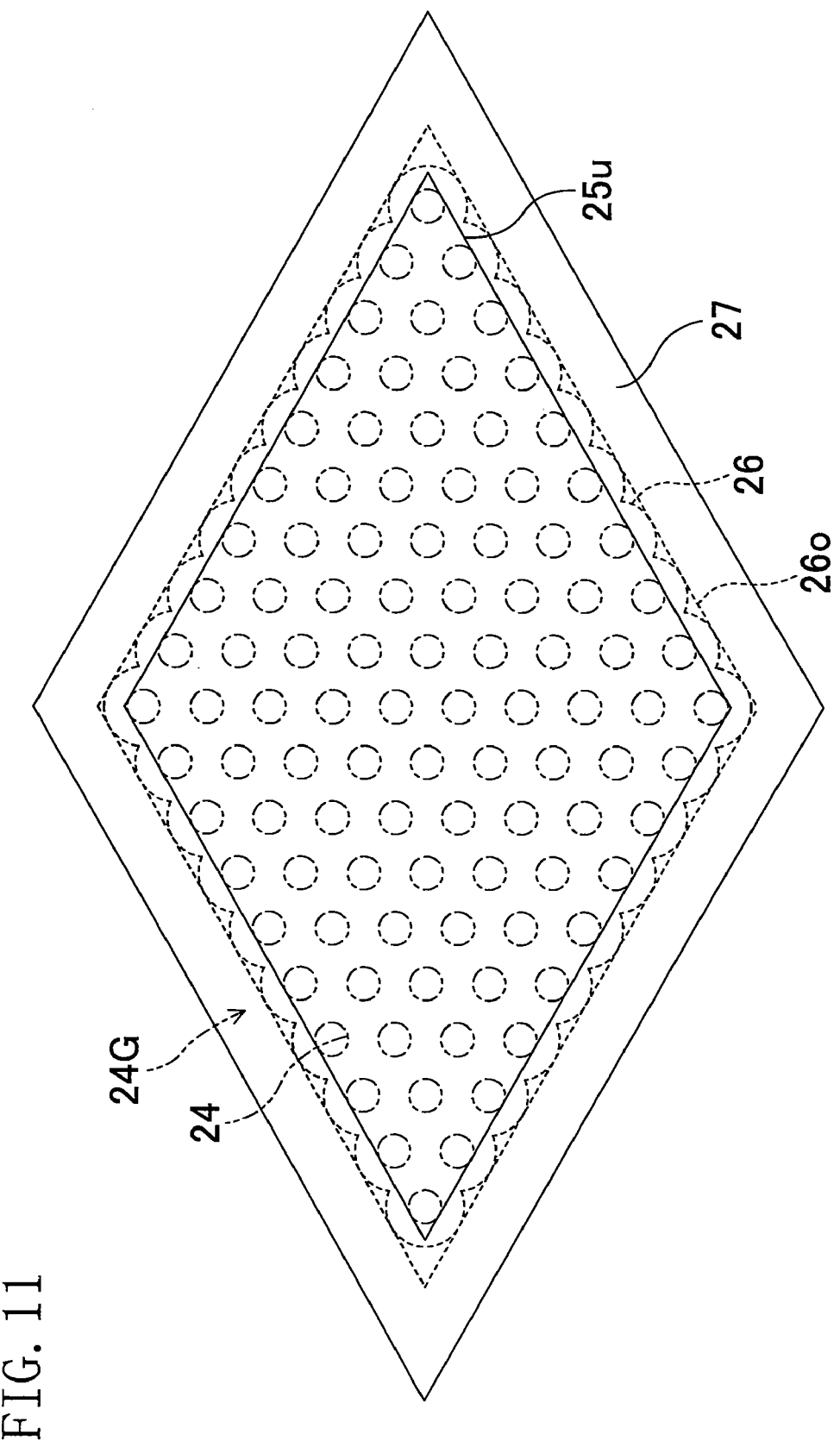
FIG. 11 is a plan view illustrating the configuration of a hole grouping, the upper open end of a through hole, an air gap, and a supporting layer in the MEMS device according to the first modified example of the first embodiment of the present invention.

Now, the configuration of the hole grouping 24G, the upper open end of the through hole 25, the air gap 26, and the supporting layer 27 will be discussed with reference to FIG. 11. FIG. 11 is a plan view illustrating the configuration of the hole grouping, the upper open end of the through hole, the air gap, and the supporting layer in the MEMS device according to the first modified example of the first embodiment of the present invention. Although the number of holes 24 in the hole grouping 24G shown in FIG. 11 differs from that in FIG. 10B, the number of holes 24 shown in each figure is provided only as an optimum number for simplicity of illustration, and differs from the actual number.

As shown in FIG. 11, the through hole with the opening having a rhombic shape at the upper open end 25u, the supporting layer 27 with the air gap 26 formed therein, and the hole grouping 24G are located in that order in the direction from the bottom surface to the top surface of the substrate.

The air gap 26 is formed using the hole grouping 24G, specifically, by removing the parts of the sacrificial layer 12 corresponding to the respective holes 24 of the hole grouping 24G. Consequently, as shown in FIG. 11, the detailed shape of the air gap 26 in plan view is defined along the outermost holes 24 of the hole grouping 24G, and has uniform curved portions corresponding to the respective outermost holes 24. On the other hand, the general shape of the air gap 26 in plan view is rhombic as shown in FIG. 11 (see the reference numeral 26o).

In other words, the shape formed by the inner side surfaces of the supporting layer 27 is defined along the outermost holes 24 of the hole grouping 24G, and has uniform curved portions corresponding to the respective outermost holes 24, because the supporting layer 27 is formed of the remaining part of the sacrificial layer 12 that has not been removed.

Furthermore, since the air gap 26 is formed using the hole grouping 24G, the general shape of the air gap 26 in plan view is similar to, but larger than, the shape of the opening of the through hole at the upper open end 25u as shown in FIG. 11.

The outermost holes 24 of the hole grouping 24G are located at regular intervals along the shape of the opening of the through hole at the upper open end 25u (in other words, along the general shape of the air gap 26 in plan view) as shown in FIG. 11. Also, as shown in FIG. 11, the holes 24 of the hole grouping 24G are arranged in a lattice pattern.

As shown in FIG. 10B, the through hole 25 is formed so as to correspond to the air gap 26 with the diaphragm 11 interposed therebetween. The area of the opening of the through hole at the upper open end 25u is smaller than that of the opening of the air gap 26 as shown in FIG. 11. Thus, the top surface of the part of the diaphragm 11 exposed in the through hole 25 is entirely exposed in the air gap 26.

Figure 12:
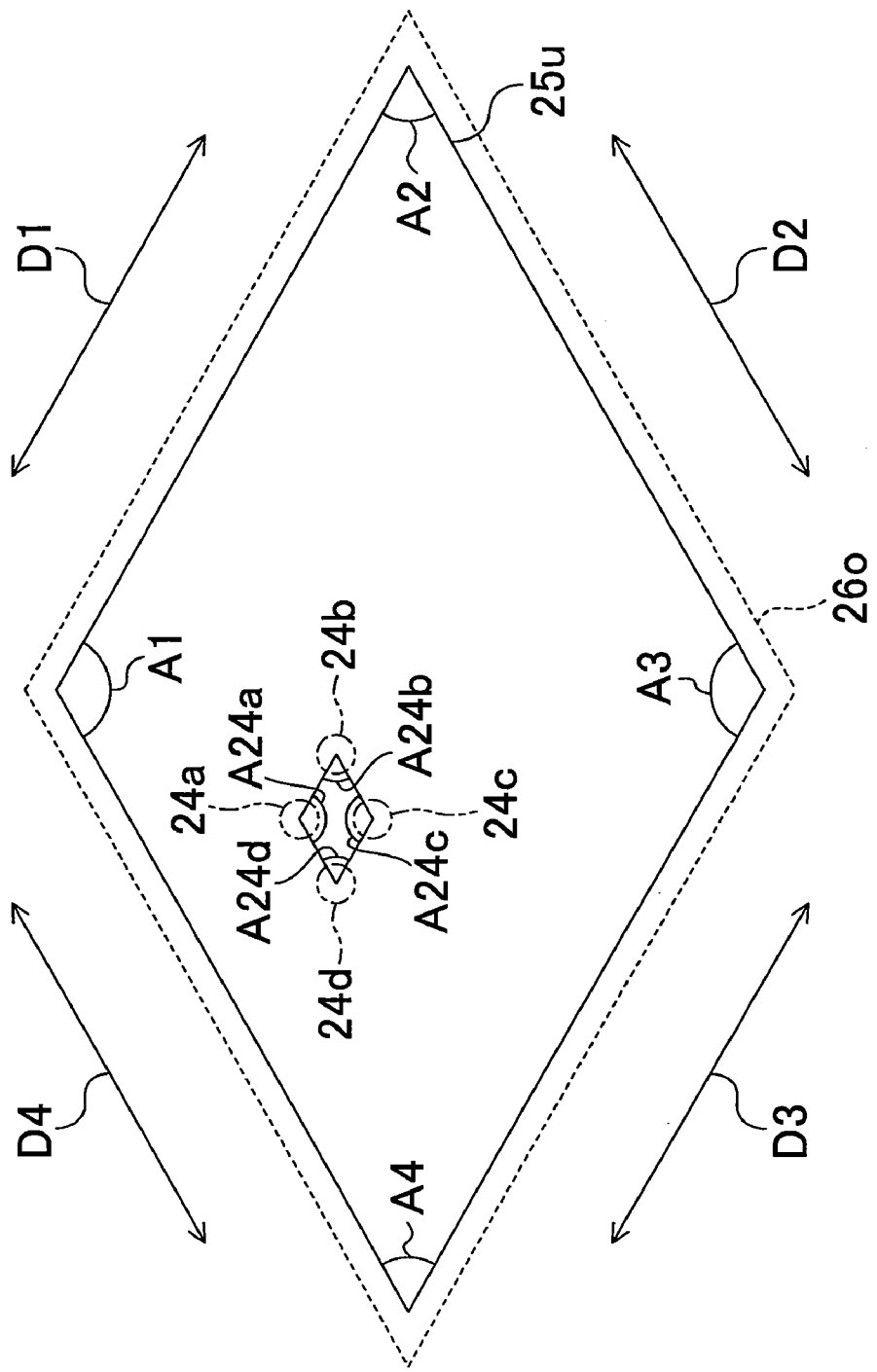
FIG. 12 is a plan view illustrating the configuration of the hole grouping, the upper open end of the through hole, and the air gap in the MEMS device according to the first modified example of the first embodiment of the present invention.

Now, the configuration of the hole grouping 24G will be described with reference to FIG. 12. FIG. 12 is a plan view illustrating the configuration of the hole grouping, the upper open end of the through hole, and the air gap in the MEMS device according to the first modified example of the first embodiment of the present invention. FIG. 12 shows the same configuration as FIG. 11. However, in FIG. 12, the illustration of the holes of the hole grouping other than the four adjacent holes, the detailed illustration of the air gap, and the illustration of the supporting layer are omitted for simplicity of illustration.

As shown in FIG. 12, when the center points of the four adjacent holes 24a to 24d in the hole grouping 24G are connected, a rhombic shape is formed in the lattice.

When the shape of the opening of the through hole at the upper open end 25u is a rhombic shape satisfying:
the interior angle A1, A3=x°, and
the interior angle A2, A4=180°−x°,
then the shape formed in the lattice by connecting the center points of the four adjacent holes 24a to 24d in the hole grouping 24G is a rhombic shape satisfying:
the interior angle A24a, A24c=x°, and
the interior angle A24b, A24d=180°−x°.

As shown in FIG. 12, it is assumed that first, second, third, and fourth sides of the shape of the opening of the through hole at the upper open end 25u extend in first-, second-, third-, and fourth-side directions D1, D2, D3, and D4, respectively. In this case, of the four adjacent holes 24a to 24d, the holes 24a and 24b are located adjacent to each other in the first-side direction D1, the holes 24b and 24c are located adjacent to each other in the second-side direction D2, the holes 24c and 24d are located adjacent to each other in the third-side direction D3, and the holes 24d and 24a are located adjacent to each other in the fourth-side direction D4.

In this modified example, effects similar to those of the first embodiment are achievable.

In the specific example described in this modified example, the shape of the opening of the through hole at the upper open end 25u is rhombic as shown in FIG. 11, however, the present invention is not limited to this. For example, the opening of the through hole may have a quadrilateral shape, such as a rectangular or square shape, at the upper open end.

Furthermore, in the specific example described in this modified example, as shown in FIG. 11, the outermost holes 24 of the hole grouping 24G are located at regular intervals along the shape of the opening of the through hole at the upper open end 25u, and the holes 24 of the hole grouping 24G are arranged in a lattice pattern. However, the present invention is not limited to this.

For example, the inner holes of the hole grouping may be arranged in a lattice pattern or randomly, while the outermost holes are located at regular intervals along the shape of the opening of the through hole at the upper open end.

Moreover, in the specific example described in this modified example, in order to achieve the object of the present invention effectively, the outermost holes 24 of the hole grouping 24G are located at the same regular intervals along all four sides of the shape (i.e., the rhombic shape) of the opening of the through hole at the upper open end 25u as shown in FIG. 11. However, the present invention is not limited to this. For example, in the hole grouping, the outermost holes along each side of the rhombic shape may be located at regular intervals specifically determined for that side.

Also, in the specific examples described in the first embodiment and the first modified example thereof, a substrate having a rhombic shape in plan view is used as the substrate 10. However, the present invention is not limited to this. For example, a substrate having a rectangular or square shape in plan view may also be used.

Second Modified Example of the First Embodiment

The following describes a MEMS device according to a second modified example of the first embodiment of the present invention with reference to FIGS. 13A to 13C, 14A and 14B, 15A and 15B, and 16.

A method for fabricating the MEMS device according to the second modified example of the first embodiment of the present invention will be described below with reference to FIGS. 13A to 15B. FIGS. 13A to 15B sequentially show process steps of the method for fabricating the MEMS device according to the second modified example of the first embodiment of the present invention, illustrating how the major components thereof are formed. To be specific, in FIGS. 13A to 15B, the plan views shown in the upper sections are as seen from above the top surface of a substrate, the cross-sectional views shown in the middle sections are taken along the lines XIIIa-XIIIa to XVb-XVb, respectively, and the plan views shown in the lower sections are as seen from the bottom surface of the substrate. The components in this modified example are made of the same materials as those in the first embodiment.

First, as shown in FIG. 13A, there is provided a substrate 30 having a (110) crystal face, and having a square shape in plan view.

Next, as shown in FIG. 13B, a diaphragm 31, having a square shape in plan view, is formed on the top surface of the substrate 30.

Then, as shown in FIG. 13C, a sacrificial layer 32, having a square shape in plan view, is formed on the diaphragm 31.

Figure 14A:
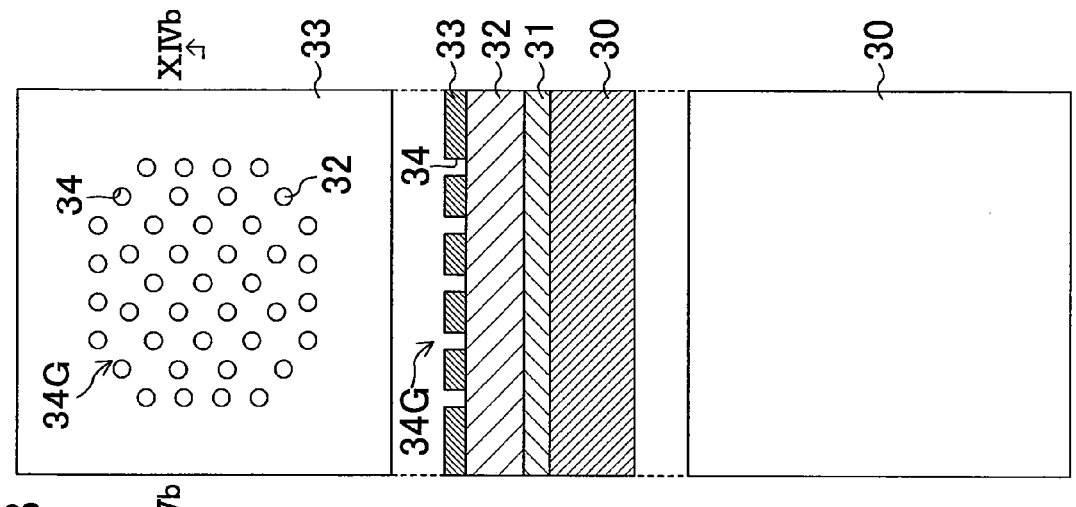
FIGS. 14A and 14B sequentially show process steps of the method for fabricating the MEMS device according to the second modified example of the first embodiment of the present invention, illustrating how the major components thereof are formed.

Subsequently, as shown in FIG. 14A, a fixed film 33, having a square shape in plan view, is formed on the sacrificial layer 32.

Figure 14B:
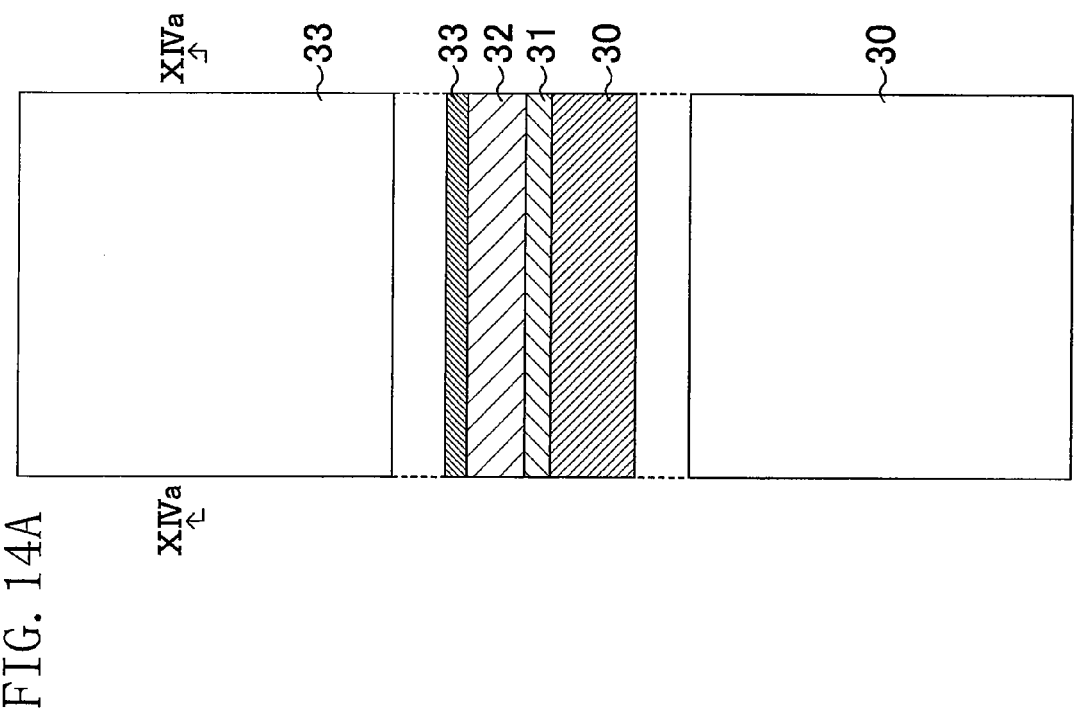

Then, as shown in FIG. 14B, holes 34 are formed through the fixed film 33, each exposing the top surface of the sacrificial layer 32, thereby forming a hole grouping 34G, composed of the holes 34, in the fixed film 33. In this process step, the hole grouping 34G is formed in such a manner that the outermost holes 34 thereof are located at regular intervals along the shape of the opening of a through hole (which is to be formed in a subsequent process step) at the upper open end. Also, in this process, the hole grouping 34G is formed so that the holes 34 thereof other than the outermost holes 34 (hereinafter referred to as "inner holes 34 of the hole grouping 34G") are arranged in a lattice pattern.

Figure 15A:
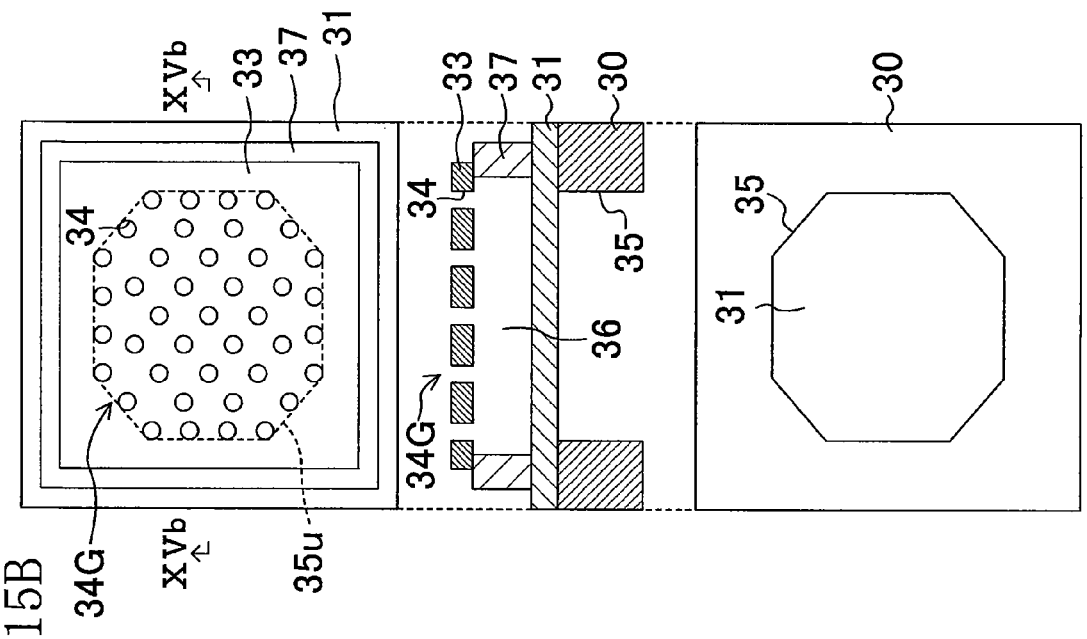
FIGS. 15A and 15B sequentially show process steps of the method for fabricating the MEMS device according to the second modified example of the first embodiment of the present invention, illustrating how the major components thereof are formed.

Then, as shown in FIG. 15A, in a manner similar to that shown in FIG. 3A in the first embodiment, a through hole 35 is formed through the substrate 30 to expose the bottom surface of the diaphragm 31. In this process step, as can be seen from the plan view shown in the lower section of FIG. 15A, the through hole 35 is formed so that its opening has an octagonal shape at the upper and lower open ends.

Figure 15B:
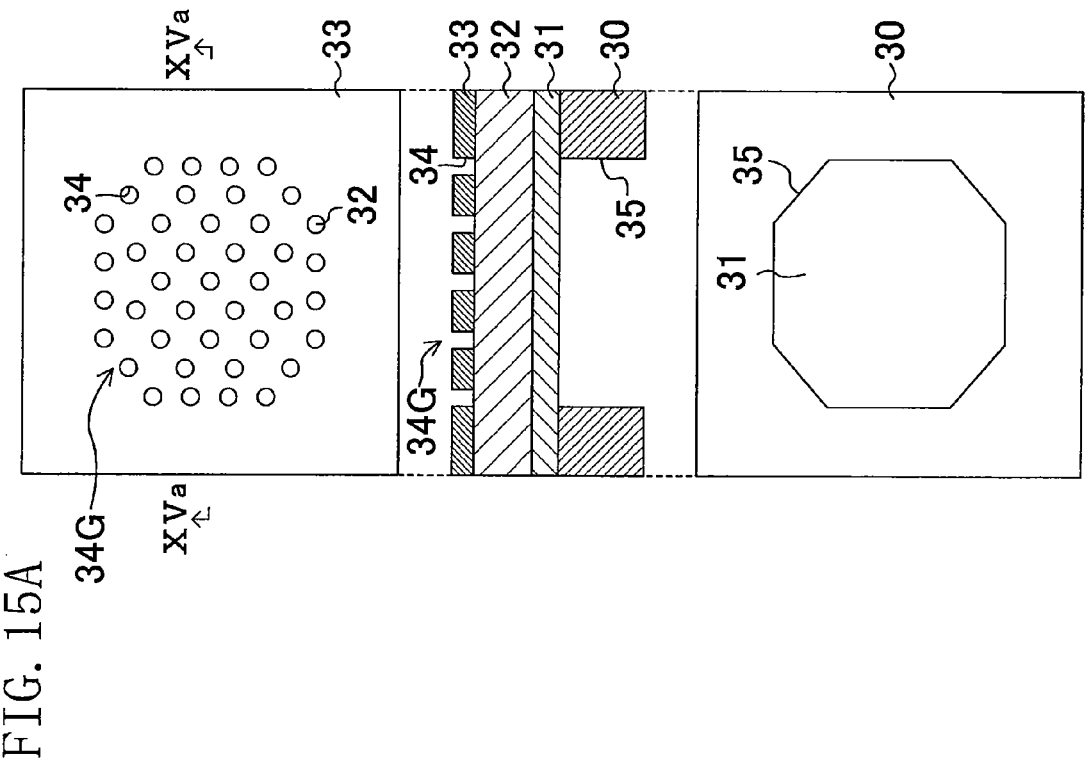

Subsequently, as shown in FIG. 15B, in a manner similar to that shown in FIG. 3B in the first embodiment, parts of the sacrificial layer 32 corresponding to the respective holes 34 of the hole grouping 34G are removed using the hole grouping 34G, thereby forming an air gap 36 in the sacrificial layer 32, and forming a supporting layer 37 out of the remaining part of the sacrificial layer 32.

In this way, the MEMS device according to this modified example is fabricated.

The configuration of the MEMS device according to the second modified example of the first embodiment of the present invention will be described below with reference to FIG. 15B.

As shown in FIG. 15B, the MEMS device according to this modified example includes: the substrate 30 having the through hole 35; the diaphragm 31 provided on the top surface of the substrate 30 with the bottom surface of the diaphragm 31 partially exposed in the through hole 35; the fixed film 33 provided over the diaphragm 31 with the air gap 36 interposed therebetween and having the hole grouping 34G composed of the holes 34 each in communication with the air gap 36; and the supporting layer 37 interposed between the diaphragm 31 and the fixed film 33 and having the air gap 36 formed therein.

Figure 16:
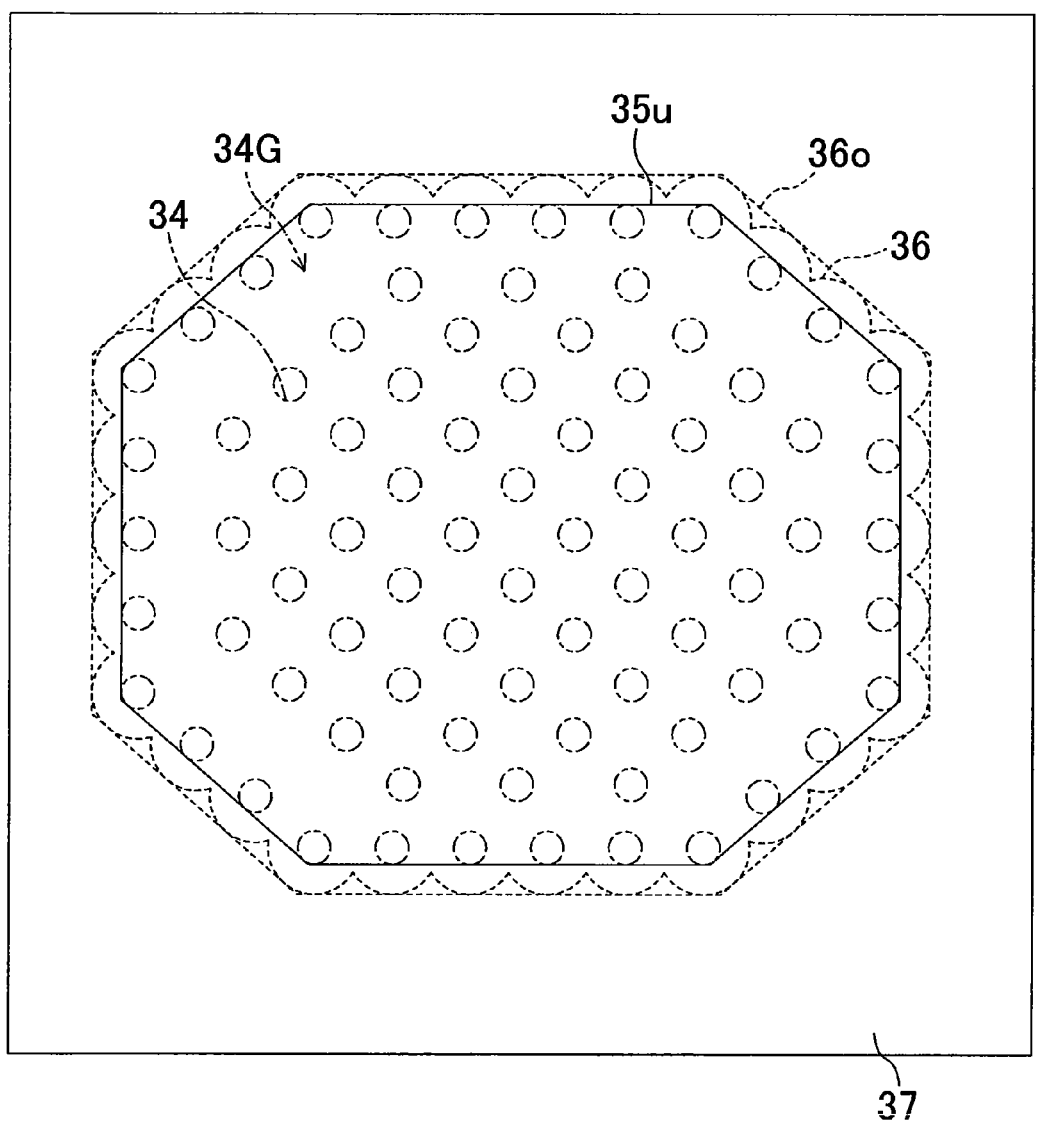
FIG. 16 is a plan view illustrating the configuration of a hole grouping, the upper open end of a through hole, an air gap, and a supporting layer in the MEMS device according to the second modified example of the first embodiment of the present invention.
Figure 17C:
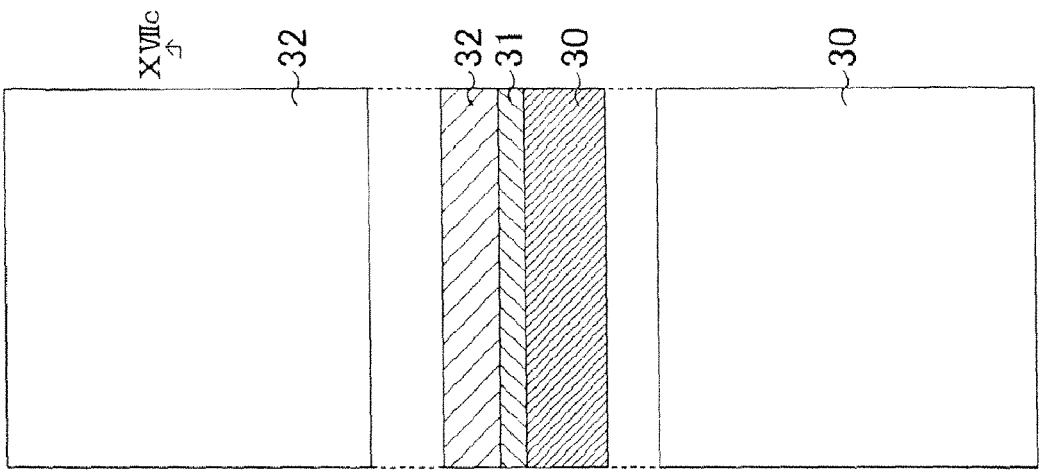
FIGS. 17A-17C sequentially show process steps of a method for fabricating a MEMS device according to a second embodiment of the present invention, illustrating how major components thereof are formed.
Figure 17B:
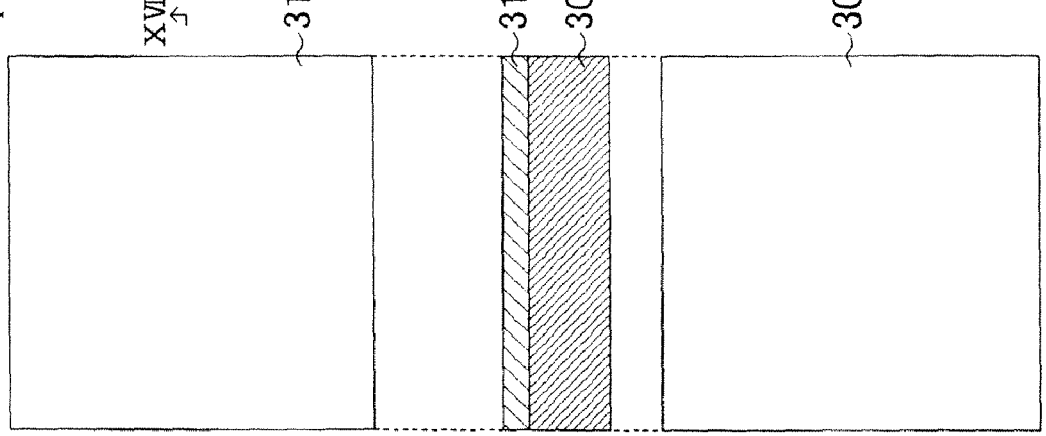
Figure 17A:
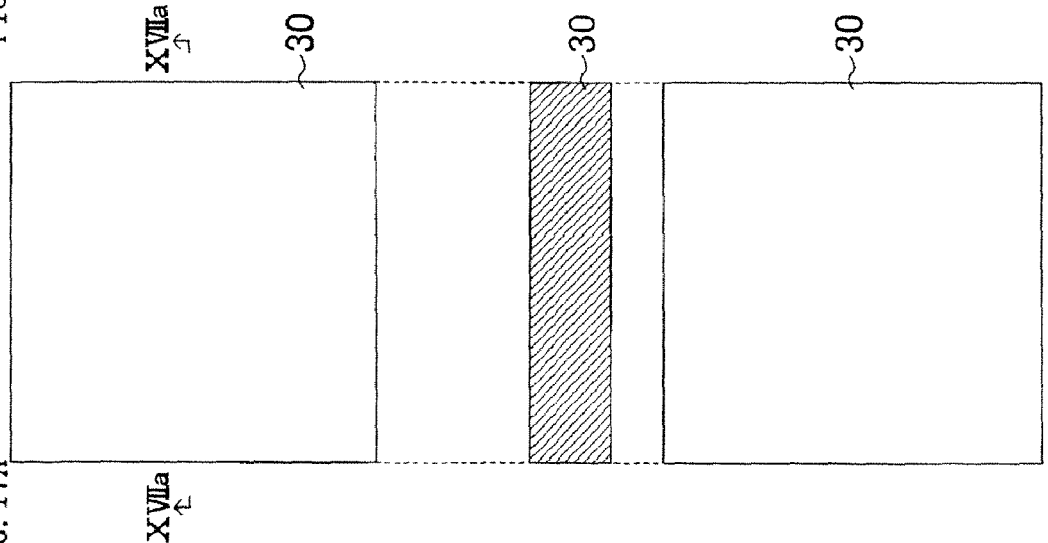

Now, the configuration of the hole grouping 34G, the upper open end of the through hole 35, the air gap 36, and the supporting layer 37 will be discussed with reference to FIG. 16. FIG. 16 is a plan view illustrating the configuration of the hole grouping, the upper open end of the through hole, the air gap, and the supporting layer in the MEMS device according to the second modified example of the first embodiment of the present invention. Although the number of holes 34 in the hole grouping 34G shown in FIG. 16 differs from that in FIG. 15B, the number of holes 34 in each figure is provided only as an optimum number for simplicity of illustration, and differs from the actual number.

As shown in FIG. 16, the through hole with the opening having an octagonal shape at the upper open end 35u, the supporting layer 37 with the air gap 36 formed therein, and the hole grouping 34G are located in that order in the direction from the bottom surface to the top surface of the substrate.

The air gap 36 is formed using the hole grouping 34G, specifically, by removing the parts of the sacrificial layer 32 corresponding to the respective holes 34 of the hole grouping 34G. Consequently, as shown in FIG. 16, the detailed shape of the air gap 36 in plan view is defined along the outermost holes 34 of the hole grouping 34G, and thus has uniform curved portions corresponding to the respective outermost holes 34. On the other hand, the general shape of the air gap 36 in plan view is octagonal as shown in FIG. 16 (see the reference numeral 36o).

In other words, the shape formed by the inner side surfaces of the supporting layer 37 is defined along the outermost holes 34 of the hole grouping 34G, and has uniform curved portions corresponding to the respective outermost holes 34, because the supporting layer 37 is formed of the remaining part of the sacrificial layer 32 that has not been removed.

Furthermore, since the air gap 36 is formed using the hole grouping 34G, the general shape of the air gap 36 in plan view is similar to, but larger than, the shape of the opening of the through hole at the upper open end 35u as shown in FIG. 16.

The outermost holes 34 of the hole grouping 34G are located at regular intervals along the shape of the opening of the through hole at the upper open end 35u (in other words, along the general shape of the air gap 36 in plan view) as shown in FIG. 16. Also, as shown in FIG. 16, the inner holes 34 of the hole grouping 34G (i.e., the holes 34 of the hole grouping 34G other than the outermost holes 34) are arranged in a lattice pattern. When the center points of four adjacent holes of the inner holes 34 are connected, a rhombic shape (or a square shape) is formed in the lattice.

As shown in FIG. 15B, the through hole 35 is formed so as to correspond to the air gap 36 with the diaphragm 31 interposed therebetween. The area of the opening of the through hole at the upper open end 35u is smaller than that of the opening of the air gap 36 as shown in FIG. 16. Thus, the top surface of the part of the diaphragm 31 exposed in the through hole 35 is entirely exposed in the air gap 36.

In this modified example, effects similar to those of the first embodiment are achievable.

In the specific example described in this modified example, as shown in FIG. 16, the outermost holes 34 of the hole grouping 34G are located at regular intervals along the shape of the opening of the through hole at the upper open end 35u, and the inner holes 34 are arranged in a lattice pattern. However, the present invention is not limited to this.

One example of an alternative approach may be as follows: the holes of the hole grouping may be arranged in a lattice pattern, while the outermost holes are located at regular intervals along the shape of the opening of the through hole at the upper open end.

Another example of an alternative approach may be as follows: the inner holes of the hole grouping may be arranged randomly, while the outermost holes are located at regular intervals along the shape of the opening of the through hole at the upper open end.

Furthermore, in the specific example described in this modified example, in order to achieve the object of the present invention effectively, the outermost holes 34 of the hole grouping 34G are located at the same regular intervals along all eight sides of the shape (i.e., the octagonal shape) of the opening of the through hole at the upper open end 35u as shown in FIG. 16. However, the present invention is not limited to this. For example, in the hole grouping, the outermost holes along each side of the octagonal shape may be located at regular intervals specifically determined for that side.

Also, in the specific example described in this modified example, a substrate having a square shape in plan view is used as the substrate 30. However, the present invention is not limited to this. For example, a substrate having a rectangular, rhombic, or some other shape in plan view may also be used.

Second Embodiment

The following describes a MEMS device according to a second embodiment of the present invention with reference to FIGS. 17A to 17C, 18A and 18B, 19A and 19B, and 20.

A method for fabricating the MEMS device according to the second embodiment of the present invention will be described below with reference to FIGS. 17A to 19B. FIGS. 17A to 19B sequentially show process steps of the method for fabricating the MEMS device according to the second embodiment of the present invention, illustrating how the major components thereof are formed. To be specific, in FIGS. 17A to 19B, the plan views shown in the upper sections are as seen from the top surface of a substrate, the cross-sectional views shown in the middle sections are taken along the lines XVIIa-XVIIa to XIXb-XIXb, respectively, and the plan views shown in the lower sections are as seen from the bottom surface of the substrate. In FIGS. 17A to 19B, the same components as those of the second modified example of the first embodiment shown in FIGS. 13A to 15B are identified by the same reference numerals. Thus, in this embodiment, the description already provided in the second modified example of the first embodiment will not be repeated as appropriate in order to avoid duplication.

First, process steps shown in FIGS. 17A to 18A are sequentially performed in the same manner as the process steps shown in FIGS. 13A to 14A in the second modified example of the first embodiment, thereby obtaining the configuration shown in FIG. 18A (i.e., obtaining a configuration similar to that shown in FIG. 14A in the second modified example of the first embodiment).

Next, as shown in FIG. 18B, holes 44 are formed through the fixed film 33, each exposing the top surface of the sacrificial layer 32, thereby forming a hole grouping 44G, composed of the holes 44, in the fixed film 33. In this process step, the hole grouping 44G is formed in such a manner that the outermost holes 44 thereof are located at regular intervals along the shape of the opening of a through hole (which is to be formed in a subsequent process step) at the upper open end. The hole grouping 44G is also formed so that the holes 44 thereof other than the outermost holes 44 (hereinafter referred to as "inner holes 44 of the hole grouping 44G") are arranged in a lattice pattern.

Figure 19A:
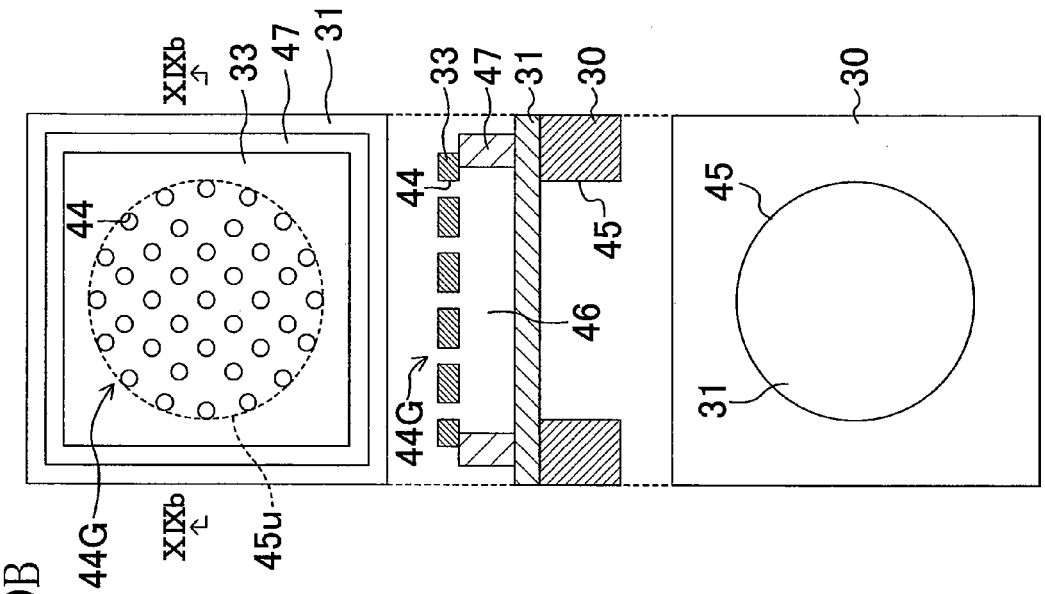
FIGS. 19A and 19B sequentially show process steps of the method for fabricating the MEMS device according to the second embodiment of the present invention, illustrating how the major components thereof are formed.

Then, as shown in FIG. 19A, in a manner similar to that shown in FIG. 3A in the first embodiment, a through hole 45 is formed through the substrate 30 to expose the bottom surface of the diaphragm 31. In this process step, as can be seen from the plan view shown in the lower section of FIG. 19A, the through hole 45 is formed so that the opening thereof has a circular shape at the upper and lower open ends.

Figure 19B:
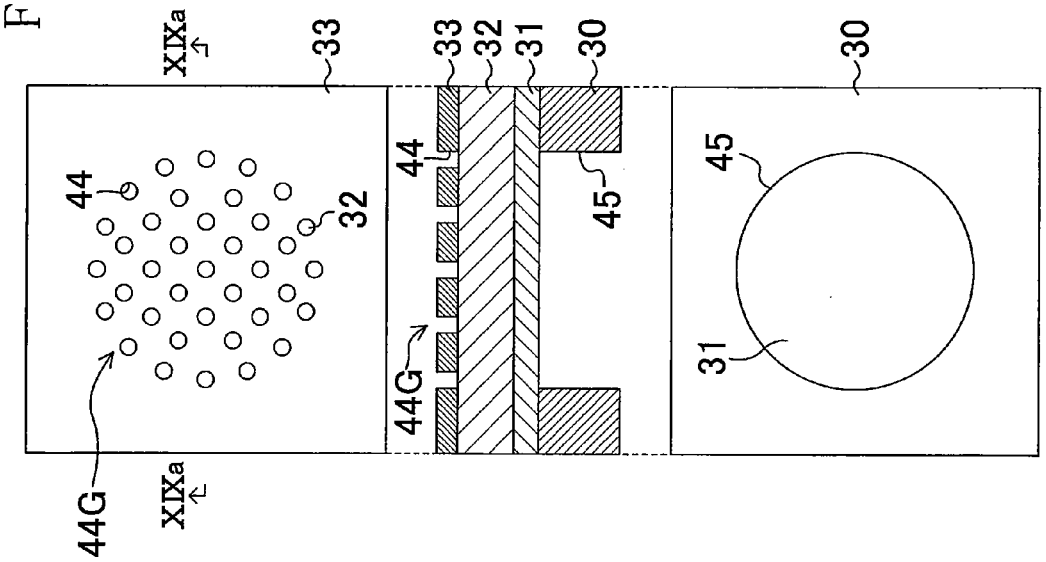

Subsequently, as shown in FIG. 19B, in a manner similar to that shown in FIG. 3B in the first embodiment, parts of the sacrificial layer 32 corresponding to the respective holes 44 of the hole grouping 44G are removed using the hole grouping 44G, thereby forming an air gap 46 in the sacrificial layer 32, and forming a supporting layer 47 out of the remaining part of the sacrificial layer 32.

In this way, the MEMS device according to this embodiment is fabricated.

The configuration of the MEMS device according to the second embodiment of the present invention will be described below with reference to FIG. 19B.

As shown in FIG. 19B, the MEMS device according to this embodiment includes: the substrate 30 having the through hole 45; the diaphragm 31 provided on the top surface of the substrate 30 with the bottom surface of the diaphragm 31 partially exposed in the through hole 45; the fixed film 33 provided over the diaphragm 31 with the air gap 46 interposed therebetween and having the hole grouping 44G composed of the holes 44 each in communication with the air gap 46; and the supporting layer 47 interposed between the diaphragm 31 and the fixed film 33 and having the air gap 46 formed therein.

Figure 20:
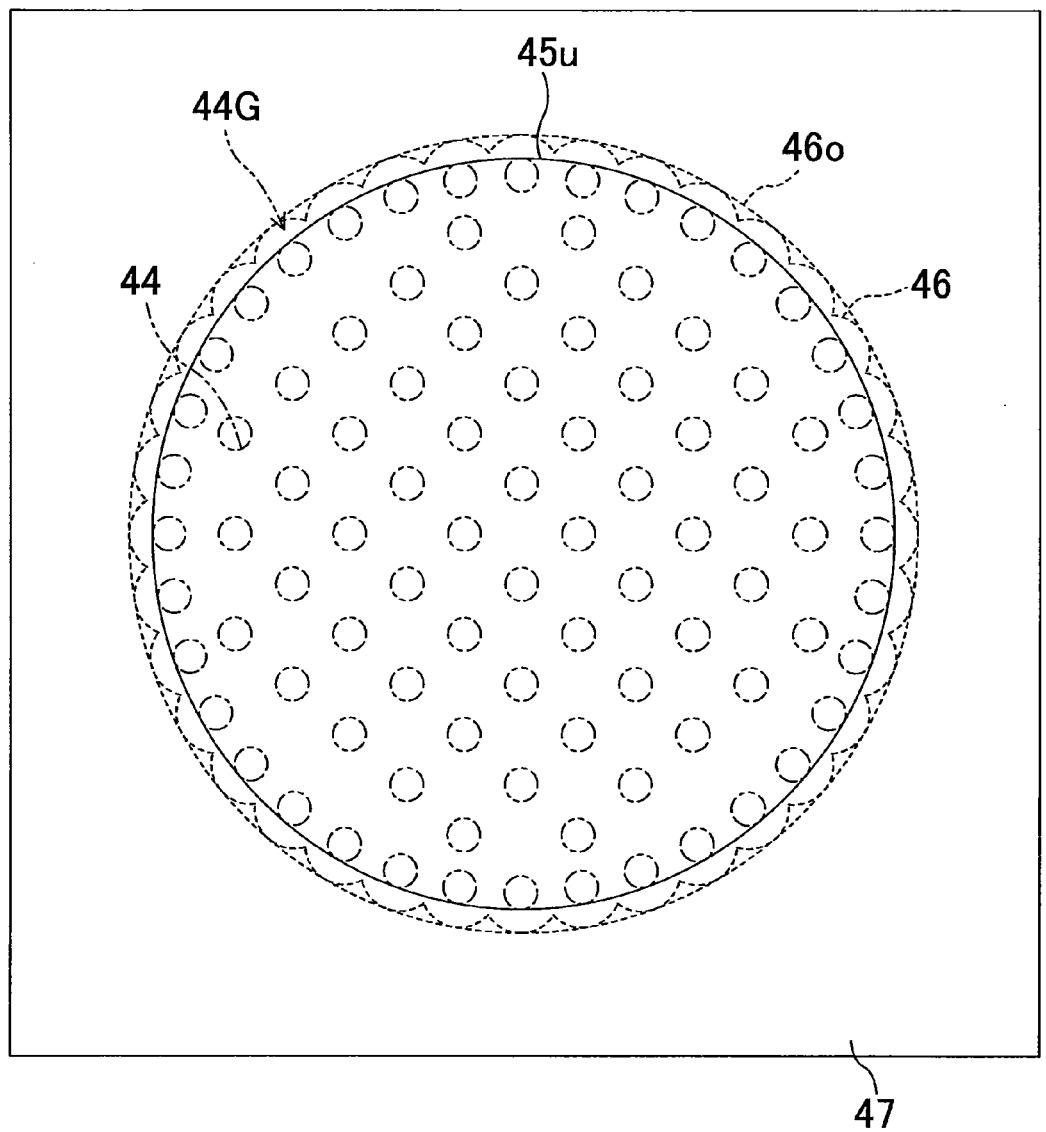
FIG. 20 is a plan view illustrating the configuration of a hole grouping, the upper open end of a through hole, an air gap, and a supporting layer in the MEMS device according to the second embodiment of the present invention.

Now, the configuration of the hole grouping 44G, the upper open end of the through hole 45, the air gap 46, and the supporting layer 47 will be discussed with reference to FIG. 20. FIG. 20 is a plan view illustrating the configuration of the hole grouping, the upper open end of the through hole, the air gap, and the supporting layer in the MEMS device according to the second embodiment of the present invention. Although the number of holes 44 in the hole grouping 44G shown in FIG. 20 differs from that in FIG. 19B, the number of holes 44 in each figure is provided only as an optimum number for simplicity of illustration, and differs from the actual number.

As shown in FIG. 20, the through hole with the opening having a circular shape at the upper open end 45u, the supporting layer 47 with the air gap 46 formed therein, and the hole grouping 44G are located in that order in the direction from the bottom surface to the top surface of the substrate.

The air gap 46 is formed using the hole grouping 44G, specifically, by removing the parts of the sacrificial layer 32 corresponding to the respective holes 44 of the hole grouping 44G. Hence, as shown in FIG. 20, the detailed shape of the air gap 46 in plan view is defined along the outermost holes 44 of the hole grouping 44G, and has uniform curved portions corresponding to the respective outermost holes 44. On the other hand, the general shape of the air gap 46 in plan view is circular as shown in FIG. 20 (see the reference numeral 46o).

In other words, the shape formed by the inner side surfaces of the supporting layer 47 is defined along the outermost holes 44 of the hole grouping 44G, and has uniform curved portions corresponding to the respective outermost holes 44, because the supporting layer 47 is formed of the remaining part of the sacrificial layer 32 that has not been removed.

Furthermore, since the air gap 46 is formed using the hole grouping 44G, the general shape of the air gap 46 in plan view is similar to, but larger than, the shape of the opening of the through hole at the upper open end 45u as shown in FIG. 20.

The outermost holes 44 of the hole grouping 44G are located at regular intervals along the shape of the opening of the through hole at the upper open end 45u (in other words, along the general shape of the air gap 46 in plan view) as shown in FIG. 20. Also, as shown in FIG. 20, the inner holes 44 of the hole grouping 44G (i.e., the holes 44 of the hole grouping 44G other than the outermost holes 44) are arranged in a lattice pattern. When the center points of four adjacent holes of the inner holes 44 are connected, a rhombic shape (or a square shape) is formed in the lattice.

As shown in FIG. 19B, the through hole 45 is formed so as to correspond to the air gap 46 with the diaphragm 31 interposed therebetween. As shown in FIG. 20, the area of the opening of the through hole at the upper open end 45u is smaller than that of the opening of the air gap 46. Thus, the top surface of the part of the diaphragm 31 that is exposed in the through hole 45 is entirely exposed in the air gap 46.

In this embodiment, the outermost holes 44 of the hole grouping 44G are located at regular intervals along the shape of the opening of the through hole 45 at the upper open end 45u. Thus, the supporting layer 47 is formed so that its inner side surfaces form a shape having uniform curved portions (in other words, the supporting layer 47 is formed so that its inner side surfaces form a shape having uniformly spaced intersection points). This prevents concentration of stress (specifically, e.g., tensile stress or the like applied to the fixed film 33) and resulting cracks in specific locations (specifically, e.g., at specific intersection points or the like) in the part of the fixed film 33 that is in contact with the supporting layer 47.

At the same time, it is also possible to prevent concentration of stress and resulting cracks in specific locations (specifically, e.g., at specific intersection points or the like) in the inner side surfaces of the supporting layer 47, because the supporting layer 47 is formed so that its inner side surfaces form a shape having the uniform curved portions.

In addition, as set forth above, since cracks are prevented in the fixed film 33, the fixed film 33 can be formed with higher tensile stress being applied thereto. This prevents the fixed film 33 from sticking to the diaphragm 31 in the process step of forming the air gap and the supporting layer.

Furthermore, the inner holes 44 of the hole grouping 44G, which are arranged in a lattice pattern, are arranged uniformly in the fixed film 33, thereby allowing an etchant to uniformly permeate parts of the sacrificial layer 32 in the process step of forming the air gap and the supporting layer.

Moreover, since the area of the opening of the through hole 45 at the upper open end 45u is formed smaller than that of the opening of the air gap 46, the top surface of the part of the diaphragm 31 exposed in the through hole 45 is entirely exposed in the air gap 46, enabling the entire part of the diaphragm 31 exposed in the through hole 45 to vibrate.

In the specific example described in this embodiment, as shown in FIG. 20, the outermost holes 44 of the hole grouping 44G are located at regular intervals along the shape of the opening of the through hole at the upper open end 45u, and the inner holes 44 are arranged in a lattice pattern. However, the present invention is not limited to this.

For example, the inner holes of the hole grouping may be arranged in a concentric circle pattern or randomly, while the outermost holes are located at regular intervals along the shape of the opening of the through hole at the upper open end.

Modified Example of the Second Embodiment

Figure 21:
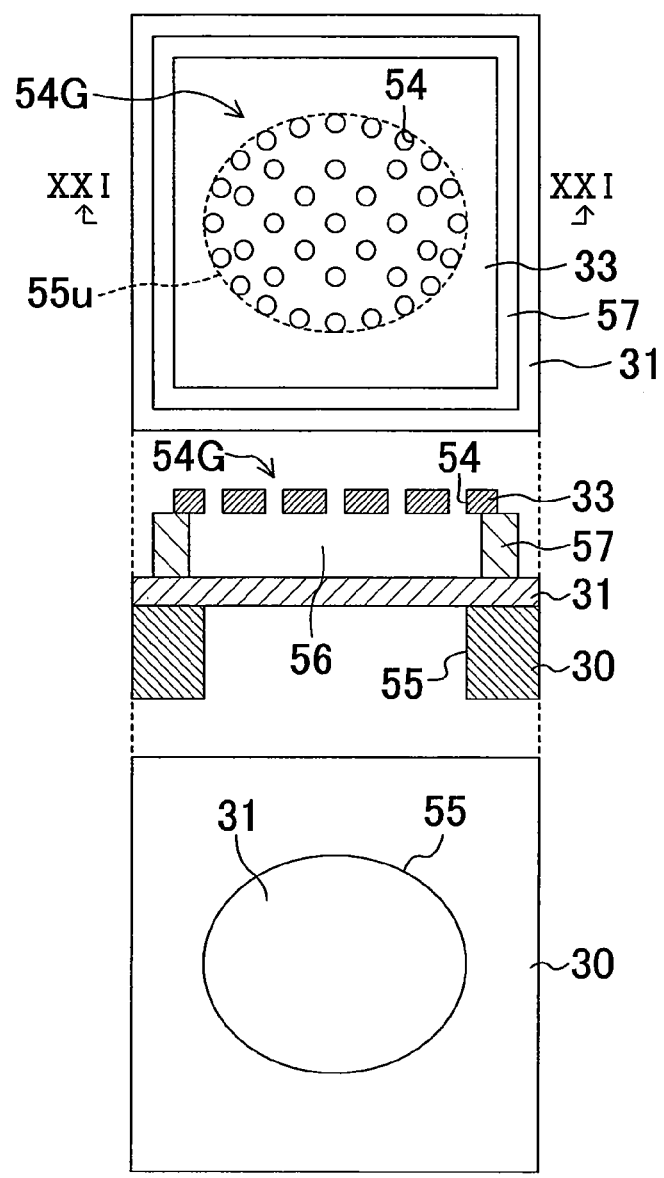
FIG. 21 illustrates the configuration of a MEMS device according to a modified example of the second embodiment of the present invention.
Figure 22:
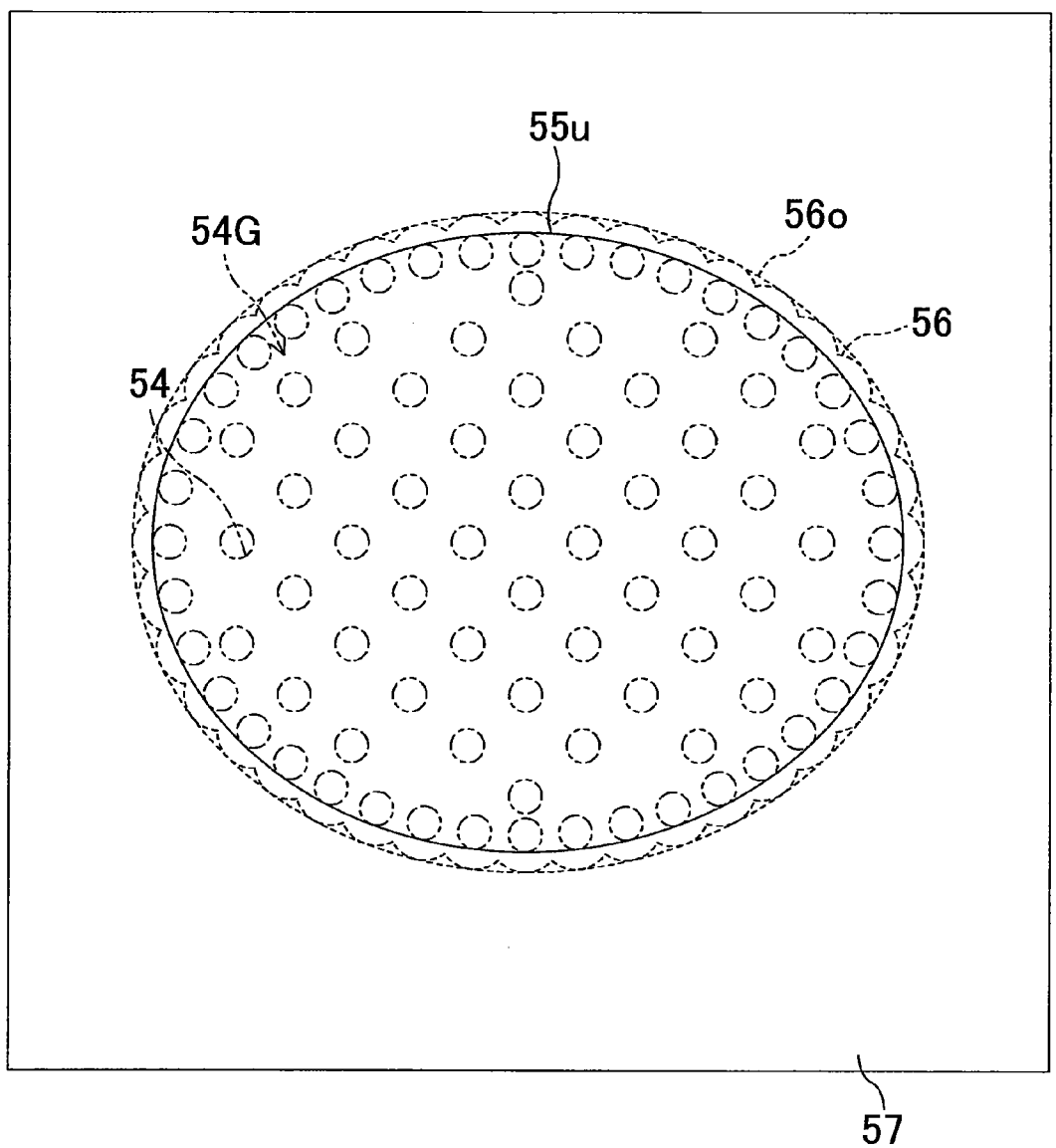
FIG. 22 is a plan view illustrating the configuration of a hole grouping, the upper open end of a through hole, an air gap, and a supporting layer in the MEMS device according to the modified example of the second embodiment of the present invention.
Figure 23:
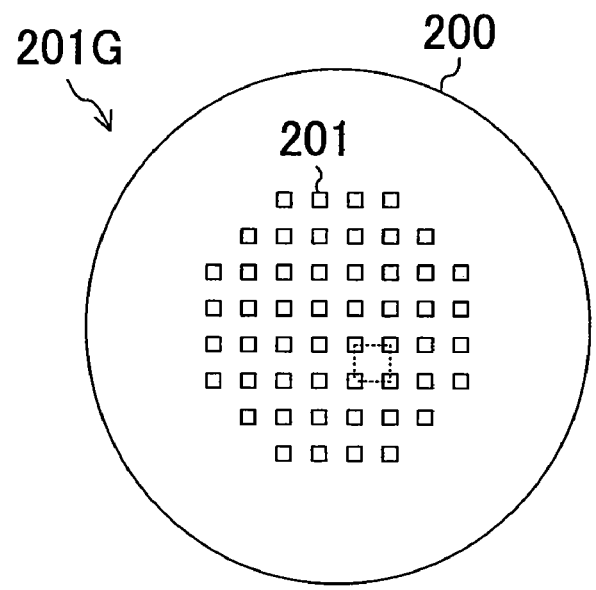
FIG. 23 is a plan view illustrating the configuration of a fixed film in a conventional MEMS device.
Figure 24:
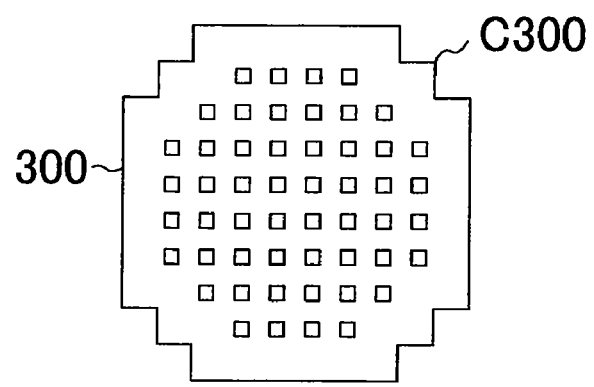
FIG. 24 is a plan view illustrating the configuration of an air gap in the conventional MEMS device.

The following describes a MEMS device according to a modified example of the second embodiment of the present invention with reference to FIGS. 21 and 22.

The configuration of the MEMS device according to the modified example of the second embodiment of the present invention will be described below with reference to FIG. 21. FIG. 21 illustrates the configuration of the MEMS device according to the modified example of the second embodiment of the present invention. To be specific, in FIG. 21, the plan view shown in the upper section is as seen from above the top surface of a substrate, the cross-sectional view shown in the middle section is taken along the line XXI-XXI, and the plan view shown in the lower section is as seen from the bottom surface of the substrate. In FIG. 21, the same components as those of the second embodiment shown in FIG. 19B are identified by the same reference numerals. Thus, in this modified example, the description already provided in the second embodiment will not be repeated as appropriate in order to avoid duplication.

As shown in FIG. 21, the MEMS device according to this modified example includes: a substrate 30 having a through hole 55; a diaphragm 31 provided on the top surface of the substrate 30 with the bottom surface of the diaphragm 31 partially exposed in the through hole 55; a fixed film 33 provided over the diaphragm 31 with an air gap 56 interposed therebetween and having a hole grouping 54G composed of holes 54 each in communication with the air gap 56; and a supporting layer 57 interposed between the diaphragm 31 and the fixed film 33 and having the air gap 56 formed therein.

Now, the configuration of the hole grouping 54G, the upper open end of the through hole 55, the air gap 56, and the supporting layer 57 will be discussed with reference to FIG. 22. FIG. 22 is a plan view illustrating the configuration of the hole grouping, the upper open end of the through hole, the air gap, and the supporting layer in the MEMS device according to the modified example of the second embodiment of the present invention. Although the number of holes 54 in the hole grouping 54G shown in FIG. 22 differs from that in FIG. 21, the number of holes 54 shown in each figure is provided only as an optimum number for simplicity of illustration, and differs from the actual number.

As shown in FIG. 22, the through hole with an opening having an elliptical shape at the upper open end 55u, the supporting layer 57 with the air gap 56 formed therein, and the hole grouping 54G are located in that order in the direction from the bottom surface to the top surface of the substrate.

The detailed shape of the air gap 56 in plan view is defined along the outermost holes 54 of the hole grouping 54G, and has uniform curved portions corresponding to the respective outermost holes 54 as shown in FIG. 22. On the other hand, the general shape of the air gap 56 in plan view is elliptical as shown in FIG. 22 (see the reference numeral 56o).

The shape formed by the inner side surfaces of the supporting layer 57 is defined along the outermost holes 54 of the hole grouping 54G, and has uniform curved portions corresponding to the respective outermost holes 54.

As shown in FIG. 22, the general shape of the air gap 56 in plan view is similar to, but larger than, the shape of the opening of the through hole at the upper open end 55u.

The outermost holes 54 of the hole grouping 54G are located at regular intervals along the shape of the opening of the through hole at the upper open end 55u (in other words, along the general shape of the air gap 56 in plan view) as shown in FIG. 22. Also, as shown in FIG. 22, the inner holes 54 of the hole grouping 54G (i.e., the holes 54 of the hole grouping 54G other than the outermost holes 54) are arranged in a lattice pattern. When the center points of four adjacent holes of the inner holes 54 are connected, a rhombic shape (or a square shape) is formed in the lattice.

As shown in FIG. 21, the through hole 55 is formed so as to correspond to the air gap 56 with the diaphragm 31 interposed therebetween. As shown in FIG. 22, the area of the opening of the through hole at the upper open end 55u is smaller than that of the opening of the air gap 56. Thus, the top surface of the part of the diaphragm 31 exposed in the through hole 55 is entirely exposed in the air gap 56.

In this modified example, effects similar to those of the second embodiment are achievable.

In the specific example described in this modified example, as shown in FIG. 22, the outermost holes 54 of the hole grouping 54G are located at regular intervals along the shape of the opening of the through hole at the upper open end 55u, and the inner holes 54 are arranged in a lattice pattern. However, the present invention is not limited to this.

For example, the inner holes of the hole grouping may be arranged in a concentric ellipse pattern or randomly, while the outermost holes are located at regular intervals along the shape of the opening of the through hole at the upper open end.

Also, in the specific examples described in the second embodiment and the modified example thereof, a substrate having a square shape in plan view is used as the substrate 30. However, the present invention is not limited to this. For example, a substrate having a rectangular, rhombic, or some other shape in plan view may also be used.

Moreover, in the specific examples described in the first embodiment and the first and second modified examples thereof and in the second embodiment and the modified example thereof, the diaphragm 11, 31 is provided directly on the top surface of the substrate 10, 30. However, the present invention is not limited to this. For example, the diaphragm may be provided over the top surface of the substrate with a supporting member made of, e.g., an insulating film interposed therebetween.

As set forth above, the present invention, capable of preventing cracks in fixed films, is applicable to MEMS devices including fixed films and methods for fabricating the same.

What is claimed is:

1. A MEMS device comprising:
   a substrate having a through hole;
   a first film provided on a top surface of the substrate with a bottom surface of the first film exposed in the through hole;
   a second film provided over the first film with an air gap interposed therebetween, and having a hole grouping including holes each in communication with the air gap; and
   a supporting layer interposed between the first and second films and having the air gap formed therein,
   wherein outermost holes of the hole grouping are located at regular intervals along a shape of an opening of the through hole at an upper open end.

2. The MEMS device of claim 1, wherein inner side surfaces of the supporting layer form a shape along the respective outermost holes of the hole grouping.

3. The MEMS device of claim 1, wherein the holes of the hole grouping are arranged in a lattice pattern.

4. The MEMS device of claim 1, wherein holes of the hole grouping other than the outermost holes are arranged in a lattice pattern.

5. The MEMS device of claim 1, wherein the shape of the opening of the through hole at the upper open end is quadrilateral, hexagonal, octagonal, circular, or elliptical.

6. The MEMS device of claim 1, wherein all of the outermost holes of the hole grouping are located at regular intervals along the shape of the opening of the through hole at the upper open end.

7. A method for fabricating a MEMS device, comprising the steps of:
   (a) forming a first film on a top surface of a substrate;
   (b) forming a second film over the first film with a sacrificial layer interposed therebetween;
   (c) forming, in the second film, a hole grouping including holes each passing through the second film;
   (d) forming, in the substrate, a through hole exposing a bottom surface of the first film, after the step (c) is performed; and
   (e) removing, using the hole grouping, parts of the sacrificial layer corresponding to the respective holes of the hole grouping, thereby forming an air gap in the sacrificial layer and forming a supporting layer out of a remaining part of the sacrificial layer, after the step (d) is performed,
   wherein in the step (c), the hole grouping is formed so that outermost holes thereof are located at regular intervals along a shape of an opening of the through hole at an upper open end; and
   in the step (e), the supporting layer is formed so that inner side surfaces thereof form a shape along the outermost holes of the hole grouping.

8. The method of claim 7, wherein in the step (e), an etchant or an etching gas is supplied to the parts of the sacrificial layer through the holes of the hole grouping, thereby removing those parts.

9. The method of claim 7, wherein in the step (c), the hole grouping is formed so that the holes thereof are arranged in a lattice pattern.

10. The method of claim 7, wherein in the step (c), the hole grouping is formed so that holes thereof other than the outermost holes are arranged in a lattice pattern.

11. The method of claim 7, wherein in the step (d), the through hole is formed so that the shape of the opening at the upper open end is quadrilateral, hexagonal, octagonal, circular, or elliptical.

* * * * *